(12) United States Patent
Cleckler et al.

(10) Patent No.: US 12,057,023 B1
(45) Date of Patent: Aug. 6, 2024

(54) PIXELLATED SURVEILLANCE OF LOW-ALTITUDE AIRCRAFT USING LOW-COST NETWORKED SENSORS

(71) Applicant: SCIENTIFIC APPLICATIONS & RESEARCH ASSOCIATES, INC., Cypress, CA (US)

(72) Inventors: Jay Brannon Cleckler, Long Beach, CA (US); Jesse Lee Klang, Colorado Springs, CO (US); Sam Youngdale, Cypress, CA (US)

(73) Assignee: SCIENTIFIC APPLICATIONS & RESEARCH ASSOCIATES, INC., Cypress, CA (US)

( * ) Notice: Subject to any disclaimer, the term of this patent is extended or adjusted under 35 U.S.C. 154(b) by 0 days.

(21) Appl. No.: 17/725,899

(22) Filed: Apr. 21, 2022

Related U.S. Application Data

(60) Provisional application No. 63/186,895, filed on May 11, 2021, provisional application No. 63/177,438, filed on Apr. 21, 2021.

(51) Int. Cl.
*G08G 5/04* (2006.01)
*B64C 39/02* (2023.01)
*B64U 101/00* (2023.01)
*G08G 5/00* (2006.01)

(52) U.S. Cl.
CPC ........... *G08G 5/045* (2013.01); *B64C 39/024* (2013.01); *G08G 5/006* (2013.01); *B64U 2101/00* (2023.01)

(58) Field of Classification Search
CPC ...... G08G 5/045; G08G 5/006; B64C 39/024; B64U 2101/00
See application file for complete search history.

(56) References Cited

U.S. PATENT DOCUMENTS

| | | |
|---|---|---|
| 7,606,115 B1 | 10/2009 | Cline et al. |
| 7,916,887 B2 | 3/2011 | Clecker et al. |
| 9,685,089 B2 | 6/2017 | Panczam et al. |
| 2005/0117454 A1* | 6/2005 | Millikin ................ G01S 13/723 367/127 |
| 2015/0302858 A1* | 10/2015 | Hearing .................. G10L 25/51 381/58 |
| 2020/0099441 A1* | 3/2020 | Stein ....................... H04W 4/40 |
| 2021/0025975 A1* | 1/2021 | Seeber ................... H04N 23/66 |

* cited by examiner

*Primary Examiner* — Curtis A Kuntz
*Assistant Examiner* — James E Munion
(74) *Attorney, Agent, or Firm* — STETINA BRUNDA GARRED & BRUCKER

(57) ABSTRACT

A method of detecting and preventing airspace collision with an unmanned aerial vehicle (UAV) includes dividing an airspace into a plurality of sectors, positioning a plurality of sensor installations to detect presence of an aircraft at respective boundaries between the sectors, detecting presence of the aircraft at a first of the boundaries based on sensor data collected from a first one of the sensor installations that is positioned to detect presence of the aircraft at the first boundary, and transmitting a signal based on the detection of the presence of the aircraft at the first boundary to a control system of the UAV.

20 Claims, 13 Drawing Sheets

PIXELLATED SURVEILLANCE OF LOW-ALTITUDE AIRCRAFT USING LOW-COST NETWORKED SENSORS

CROSS-REFERENCE TO RELATED APPLICATIONS

The present application relates to and claims the benefit of U.S. Provisional Application No. 63/177,438, filed Apr. 21, 2021, and U.S. Provisional Application No. 63/186,895, filed May 11, 2021, the entire disclosure of each of which is hereby wholly incorporated by reference.

STATEMENT RE: FEDERALLY SPONSORED RESEARCH/DEVELOPMENT

Not Applicable

BACKGROUND

1. Technical Field

The present disclosure relates generally to airspace collision detection and, more particularly, to an economical system of sensors for providing surveillance in support of piloted and unmanned aircraft operations.

2. Related Art

Civilian applications of unmanned aerial vehicles (UAVs), such as homeland security, law enforcement, agriculture, and shipping/delivery services, have great promise but remain hampered by National Airspace System (NAS) regulations limiting the use of UAVs to predetermined flight corridors, restricted access zones, live oversight by a human operator and direct visual observation of the airspace by the human operator. Such restrictions are likely to remain in place until UAVs can be flown with the equivalent level of safety as piloted aircraft, particularly with the same or better attention to manned aircraft in their mutual airspace. To this end, developments have been made to fit UAVs with acoustic airspace collision warning systems that detect the sound radiated by an approaching aircraft (e.g., a manned aircraft) to estimate the position and direction of the aircraft. Examples of such systems are described in U.S. Pat. Nos. 7,606,115, 7,916,887, and 9,685,089, the entire disclosure of each of which is hereby wholly incorporated by reference. However, such systems increase the size and weight of the UAV and require design considerations for distinguishing the sound generated by the approaching aircraft from the sound generated by the UAV itself. Moreover, in cases where many UAVs are expected to transit the same corridor, such UAV-based detection systems may become overly complex and impractical in practice.

Ground-based airspace surveillance has traditionally been provided by RADAR, which uses the return of emitted radiation to determine the position of aircraft within the RADAR's range. Sometimes a network of RADARs is used to cover additional airspace. Low altitude airspace surveillance has remained very difficult for RADARs used in this traditional manner due to the presence of trees, buildings and terrain features which limit the line-of-sight that RADAR or other similar approaches need to detect low-flying aircraft. The expense of RADAR, RADAR installation and RADAR operation also make conventional use of RADAR uneconomical for many UAV applications intended to provide services at low-cost, especially given that a large number of RADAR sensors may be needed with coverage bounded to small areas dictated by the terrain features that limit line-of-sight. Such a solution is conventionally uneconomical, requiring expensive site improvements wherever installed, including power lines, data lines, and towers to raise the RADARs above the ground.

A scalable and economical approach to provide air-space surveillance, particularly in support of low-altitude UAV operations, is required for the safe integration of these UAVs into civil airspaces.

BRIEF SUMMARY

The present disclosure contemplates various systems and methods for overcoming the above drawbacks accompanying the related art. One aspect of the embodiments of the present disclosure is a method of detecting and preventing airspace collision with an unmanned aerial vehicle (UAV). The method may comprise dividing an airspace into a plurality of sectors, positioning a plurality of sensor installations to detect presence of an aircraft at respective boundaries between the sectors, detecting presence of the aircraft at a first of the boundaries based on sensor data collected from a first one of the sensor installations that is positioned to detect presence of the aircraft at the first boundary, and transmitting a signal based on the detection of the presence of the aircraft at the first boundary to a control system of the UAV.

The method may comprise detecting presence of the aircraft at a second of the boundaries based on sensor data collected from a second one of the sensor installations that is positioned to detect presence of the aircraft at the second boundary and calculating a position of the aircraft based on the sensor data collected from the first sensor installation and the sensor data collected from the second sensor installation. The sensor data collected from the first sensor installation may be acoustic sensor data, with the sensor data collected from the second sensor installation not being acoustic sensor data. The position of the aircraft may be calculated based on a sequence of the detections of the presence of the aircraft at the first boundary and the second boundary. The method may comprise calculating a trajectory of the aircraft based on the sensor data collected from the first sensor installation and the sensor data collected from the second sensor installation. The trajectory of the aircraft may be calculated based on a sequence of the detections of the presence of the aircraft at the first boundary and the second boundary. The method may comprise estimating a direction of the aircraft based on the sensor data collected from the first sensor installation.

The plurality of sensor installations may include one or more ground-based sensor installations. The plurality of sensor installations may include one or more acoustic sensor installations, each of the one or more acoustic sensor installations including a sub-array of microphones. The plurality of sensor installations may include one or more sensor installations having a sensor selected from the group consisting of a camera, a laser crossing sensor, a magnetic sensor, and a RADAR antenna. The first sensor installation may detect presence of the aircraft at the first boundary based on a detection angle of the aircraft relative to the first sensor installation. The plurality of sectors may comprise a grid.

The control system of the UAV may comprise a human-operated pilot console that generates a human-interpretable warning in response to receipt of the transmitted signal. The control system of the UAV may comprise a flight controller included in the UAV that controls a position of the UAV in response to receipt of the transmitted signal. The flight controller may initiate an evasive maneuver of the UAV or reroute the UAV in response to receipt of the transmitted signal. The flight controller may reroute the UAV to an airspace that is non-navigable by manned aircraft in response to receipt of the transmitted signal.

Another aspect of the embodiments of the present disclosure is non-transitory program storage medium on which are stored instructions executable by a processor or programmable circuit to perform operations for detecting and preventing airspace collision with an unmanned aerial vehicle (UAV). The operations may comprise detecting presence of an aircraft at a first of a plurality of boundaries between sectors of an airspace based on sensor data collected from a first one of a plurality of sensor installations that is positioned to detect presence of the aircraft at the first boundary. The operations may comprise transmitting a signal based on the detection of the presence of the aircraft at the first boundary to a control system of the UAV.

The operations may comprise detecting presence of the aircraft at a second of the boundaries based on sensor data collected from a second one of the sensor installations that is positioned to detect presence of the aircraft at the second boundary. The operations may comprise calculating a position of the aircraft based on the sensor data collected from the first sensor installation and the sensor data collected from the second sensor installation.

Another aspect of the embodiments of the present disclosure is a system for detecting and preventing airspace collision with an unmanned aerial vehicle (UAV). The system may comprise a plurality of sensor installations positioned to detect presence of an aircraft at respective boundaries between a plurality of sectors of an airspace, a processor for detecting presence of the aircraft at a first of the boundaries based on sensor data collected from a first one of the sensor installations that is positioned to detect presence of the aircraft at the first boundary, and a network link for transmitting a signal based on the detection of the presence of the aircraft at the first boundary to a control system of the UAV.

The processor may detect presence of the aircraft at a second of the boundaries based on sensor data collected from a second one of the sensor installations that is positioned to detect presence of the aircraft at the second boundary. The processor may calculate a position of the aircraft based on the sensor data collected from the first sensor installation and the sensor data collected from the second sensor installation.

Another aspect of the embodiments of the present disclosure is a method of detecting and preventing airspace collision with an unmanned aerial vehicle (UAV). The method may comprise providing a plurality of sensor installations having known detection ranges, positioning the plurality of sensor installations with overlapping detection volumes defined by their detection ranges, detecting presence of the aircraft within a first detection volume defined by the detection range of a first one of the sensor installations based on sensor data collected from the first sensor installation, detecting presence of the aircraft within a second detection volume defined by the detection range of a second one of the sensor installations based on sensor data collected from the second sensor installation, the second detection volume overlapping the first detection volume, and transmitting a signal based on the detection of the presence of the aircraft simultaneously within the first detection volume and the second detection volume to a control system of the UAV.

Another aspect of the embodiments of the present disclosure is a sensor array for detecting and preventing airspace collision with an unmanned aerial vehicle (UAV). The sensor array may include a plurality of sensor installations and a processor for detecting an aircraft based on sensor data collected from at least one of the plurality of sensor installations. In the case of acoustic sensor installations such as ground-based acoustic sensor installations, each of the acoustic sensor installations may include a sub-array of microphones and the processor may detect the aircraft based on sensor data collected from the microphones. The sensor array may include a network link for transmitting a signal based on the detection of the aircraft to a control system of the UAV. Each sensor installation may include a solar array for powering the sensor installation, e.g., via a solar charging system and battery.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of systems and methods for detecting and preventing airspace collision with an unmanned aerial vehicle (UAV). The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
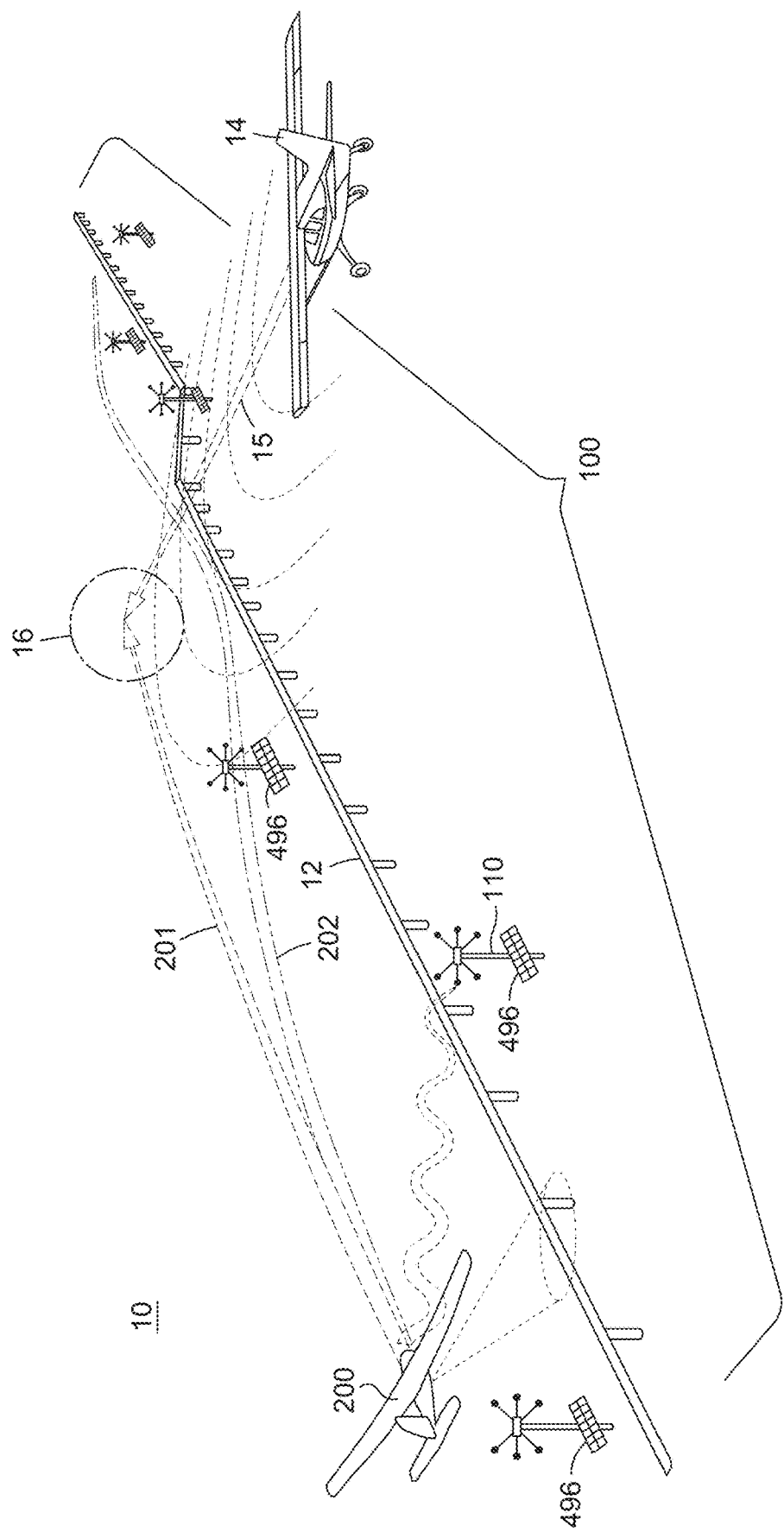
FIG. 1 shows an example system including a sensor array and an unmanned aerial vehicle (UAV) according to an embodiment of the present disclosure.

FIG. 1 shows an example system 10 including a sensor array 100 and an unmanned aerial vehicle (UAV) 200 according to an embodiment of the present disclosure. The sensor array 100 may be a terrestrial acoustic sensor array (each sensor comprising a small microphone array) as described by way of example herein or may include any combination of sensors including, but not limited to, acoustic sensors, cameras, laser crossing sensors, magnetic sensors, and/or RADAR antennas (e.g., small, low-cost RADAR with limited power and range). In general, the sensor array 100 may advantageously include low cost, low power, IoT sensors that may have minimal aircraft detection capability on their own but may be combined to provide a large network of sensors (including different types of sensors) to surveil an entire airspace. The UAV 200 may be a drone of any type including, for example, a fixed wing drone as shown, a multirotor or multicopter drone, a single rotor drone, or a hybrid thereof. In the example of FIG. 1, the UAV 200 has been deployed to inspect or monitor a pipeline 12, such as a methane pipeline, requiring the UAV 200 to share airspace with general aviation (GA) manned aircraft traffic. At the moment in time depicted in FIG. 1, an aircraft 14 (e.g., a manned aircraft) is crossing the pipeline 12 near the UAV 200, creating a risk of collision. The sensor array 100, which includes a plurality of ground-based acoustic sensor installations and/or other sensor installations 110, may collect data (e.g., acoustic data) of the approaching aircraft 14 and determine that the UAV 200 and aircraft 14 are on a collision course as represented by the convergence of a UAV flight path 201 and an aircraft flight path 15 at a collision site 16. The sensor array 100 may prevent the collision by warning or controlling the UAV 200 to avoid the aircraft 14, allowing the UAV 200 to safely pass underneath the aircraft 14 along the modified UAV flight path 202.

Figure 2A:
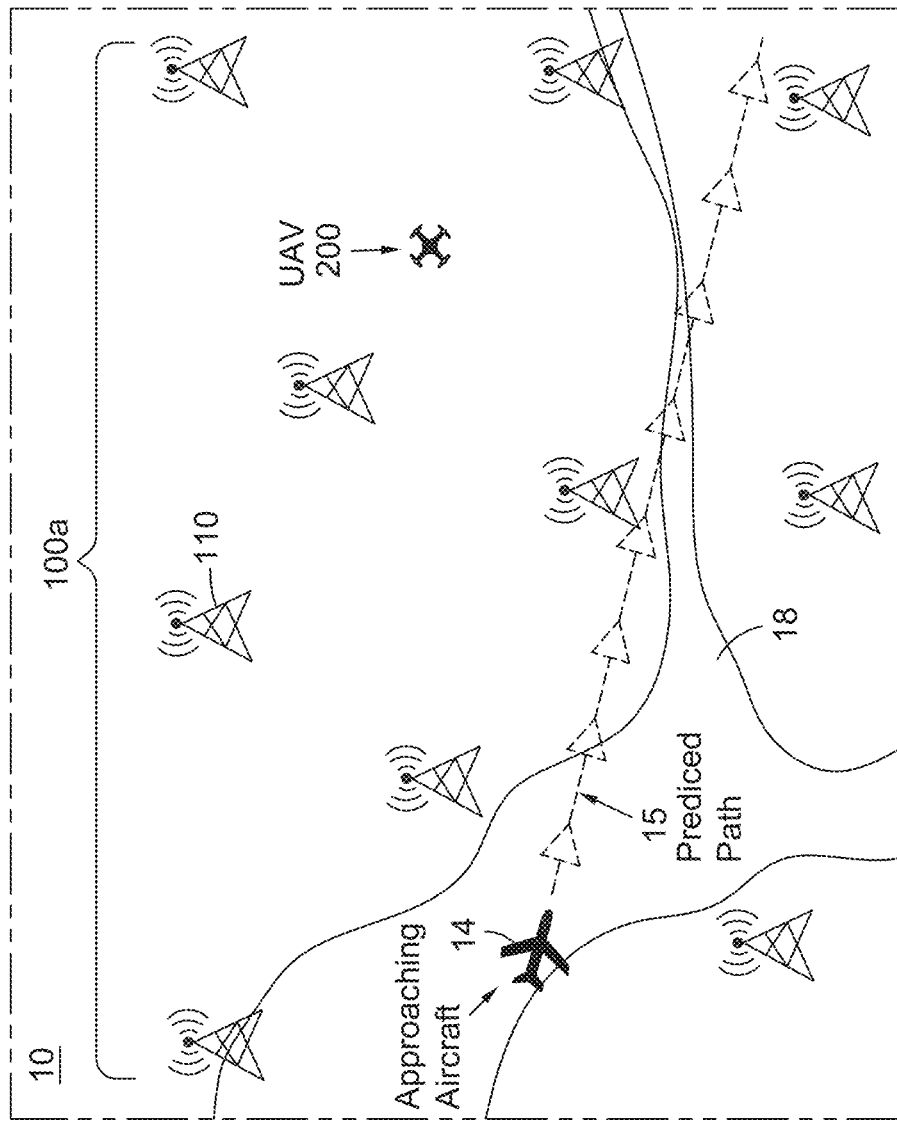
FIG. 2A is a schematic overhead view of the system.

FIG. 2A is a schematic overhead view of the system 10. In the example of FIG. 2A, the UAV 200 has been deployed to survey or map a geographic feature 18, such as a flood plain, and the aircraft 14 is crossing the geographic feature 18 near the site of UAV operations. In this example, rather than detecting that the aircraft 14 and the UAV 200 are on a collision course, the sensor array 100a (an example of the sensor array 100 of FIG. 1) only detects the aircraft 14 without reference to the precise position or flight path of the UAV 200. The sensor array 100, 100a may further identify the aircraft type of the aircraft 14 and/or calculate the flight path 15 of the aircraft 14. Based on the detection of the aircraft 14 and/or the calculated flight path 15, the sensor array 100 may then warn or control the UAV 200 to avoid the possibility of a collision, for example, by rerouting the UAV 200 to an airspace that is non-navigable by manned aircraft (e.g., close to the ground, under a canopy of trees, etc.).

Figure 2B:
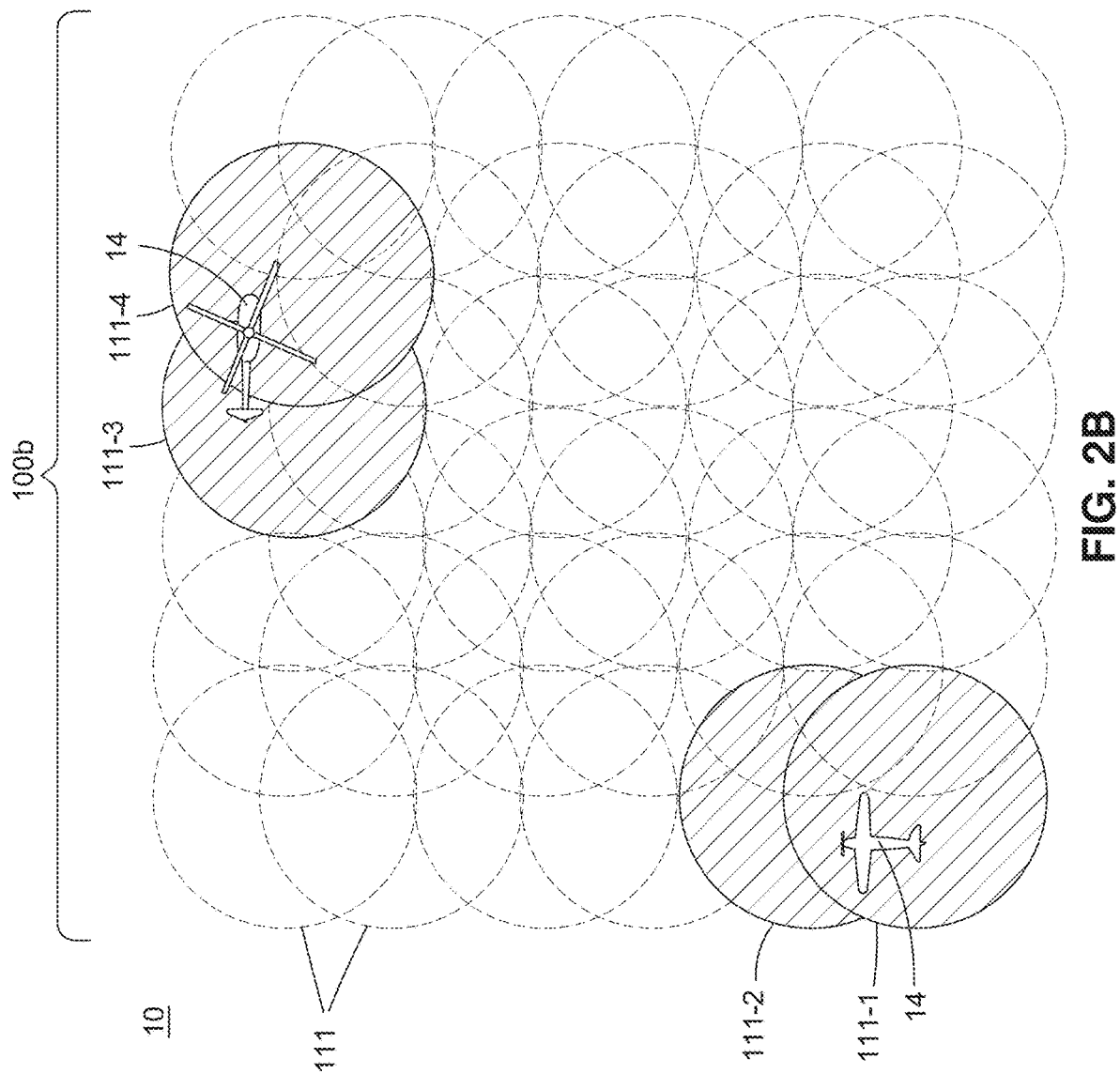
FIG. 2B is another schematic overhead view of the system, depicting the ability of overlapping sensor volumes to determine aircraft position and trajectory.

FIG. 2B is another schematic overhead view of the system 10 in a case where the system 10 is arranged as a pixelated network of sensors. In particular, a sensor array 100b is shown (as another example of the sensor array 100), the sensor array 100b being made up of a plurality of sensor installations having known detection ranges with the sensor installations being positioned with overlapping detection volumes 111 defined by their detection ranges. For ease of illustration, only the detection volumes 111 are shown, depicted as overlapping circles in FIG. 2B, and the sensor installations themselves are omitted. Typically, though not necessarily, the sensor installations would be located at the center of each respective circle, with the detection range (i.e., the radius of the circle) defining each detection volume 111 (i.e., circle). In three dimensions, the detection volumes 111 may be spherical, for example. With each detection range being known, and thus each detection volume 111 being derivable, the sensor array 100b may be used to determine position and/or other useful features (e.g., trajectory, direction, etc.) of aircraft 14 based solely on the relatively simple and inexpensive detection of aircraft presence within each detection volume 111. In this way, the required capabilities of each individual sensor installation may be greatly reduced, allowing for the use of low-cost acoustic sensors, for example. In the case of acoustic sensors, since some aircraft are louder than others, it should be noted that the detection volumes 111 may represent the detection range for the quietest aircraft that the sensor array 100b is designed to detect at an acceptable detection probability (e.g., ≥99% detection probability within 3 km detection radius).

As an example, referring to the lower-left portion of FIG. 2B, the presence of an aircraft 14 may be detected within a first detection volume 111-1 defined by the detection range of a first one of the sensor installations based on sensor data collected from the first sensor installation. The sensor data may be as basic as a binary YES/NO that the aircraft 14 is detected, without any data indicative of exactly where within the first detection volume 111-1 the aircraft 14 is detected, for example. Meanwhile, the presence of the aircraft 14 may simultaneously be detected within a second detection volume 111-2 defined by the detection range of a second one of the sensor installations based on sensor data collected from the second sensor installation. Because of the known overlap between first detection volume 111-1 and the second detection volume 111-2, it may be inferred (e.g., by a processor of the system 10, as describe in more detail below) that the aircraft 14 is located within the overlap of the two overlapping detection volumes 111-1, 111-2. Similarly, referring to the upper portion of FIG. 2B, the detected presence of an aircraft 14 within the two overlapping detection volumes 111-3 and 111-4 may be used to infer the location of a second aircraft 14 (the illustrated helicopter) within the overlap of the detection volumes 111-3, 111-4. Based on the simultaneous detection of presence within first and second overlapping detection volumes 111 (and possibly third, fourth, etc. overlapping detection volumes 111), the system 10 may transmit a signal to a control system of a UAV 200 (not shown in FIG. 2B) as described in more detail below.

As the example of FIG. 2B illustrates, it is possible for two or more aircraft 14 to be present within the sensor array 100b at the same time. As such, it must be recognized that the simultaneously detected presence of an aircraft 14 in overlapping detection volumes 111 may be due to two aircraft 14 rather than one. The system 10 may account for this theoretical possibility in several different ways. First, the detection volumes 111 and/or overlap regions may be small enough (i.e., the detection ranges of the sensor installations may be small enough and/or the spacing may be large enough) that the possibility of multiple aircraft 14 within the same overlapping set of detection volumes 111 can be practically ignored as unlikely (considering the risk of collision to the pilots and applicable laws and regulations, for example). Second, the detection capabilities of the sensor installations may make it possible for the sensor installations to distinguish between different aircraft (as having different acoustic data signatures as described below, for example), though this would require detection of more than mere presence. Third, and most advantageously, the inference of the location of an aircraft 14 based on simultaneous detection of presence within overlapping detection volumes 111 may be made based on multiple sensor readings taken at different times. So, for example, if aircraft presence is detected only in the detection volume 111-1 at successive times $t_1$, $t_2$, and $t_3$, then aircraft presence is detected in both detection volume 111-1 and detection volume 111-2 at times $t_4$ and $t_5$, and then aircraft presence is detected only in detection volume 111-2 (or in yet another overlap region) at time $t_6$, it may be inferred that the presence of multiple aircraft 14 is below a reasonable likelihood threshold based on the time between the measurement samples and the decreasing likelihood of a multi-aircraft explanation for the detection pattern. (It is noted that two or more aircraft 14 flying in formation along the same route might still be difficult to distinguish from a single aircraft, but making such a distinction may be unnecessary from the standpoint of warning and/or controlling UAVs 200 to avoid collision as described herein.) In general, the data of the entire sensor array 100b at successive times may be analyzed to calculate the most likely (and in some cases second-most likely, third-most likely, etc.) interpretation of the sensor data as to the positions and/or trajectories of one or more aircraft 14 flying within the airspace, with a resolution determined by the detection ranges of the sensors for example. If there are gaps between detection volumes 111, the positions and/or trajectories of aircraft 14 can be extrapolated based on previous measurements.

As another example, the determination of multiple aircraft positions and trajectories may be accomplished by best fitting as many as N aircraft positions and trajectories using the overlapping detection information gathered over successive times ($t_1$, $t_2$, ... $t_m$) to produce an estimate of the most likely aircraft trajectories given said detection information. These fitting approaches may also limit the fitted trajectories to a number of such trajectories less than N, which may include zero trajectories if such approach estimates that there are zero aircraft in the surveilled airspace, due, for instance, to the absence of detection data. Such fitting may be accomplished by methods relying on maximum likelihood, least squares, particle filtering, Kalman filtering or any number of techniques based on machine learning.

Figure 2C:
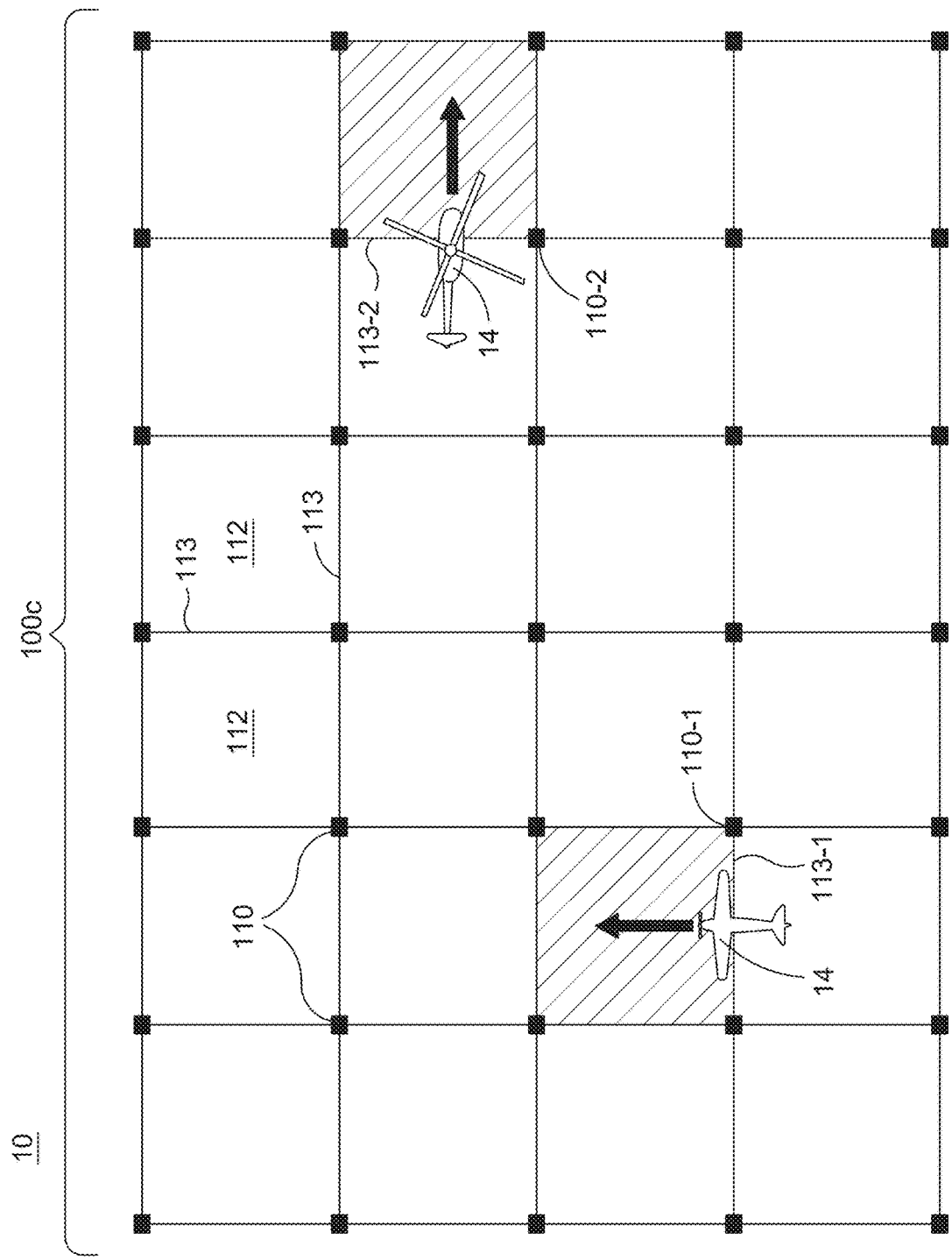
FIG. 2C is another schematic overhead view of the system.

FIG. 2C is another schematic overhead view of the system 10 in a case where the system 10 is arranged as a pixelated network of sensors, in this case the sensor array 100c (another example of the sensor array 100) made up of a plurality of sensor installations 110. In particular, an airspace is divided into a plurality of sectors 112 that may comprise a grid as shown, with the sensor installations 110 being positioned to detect the presence of aircraft 14 at respective boundaries 113 between the sectors 112. Like the sensor array 100b of FIG. 2B, the sensor array 100c of FIG. 2C may be used to determine position and/or other useful features (e.g., trajectory, direction, etc.) of aircraft 14 based solely on the relatively simple and inexpensive detection of aircraft presence, this time at each boundary 113 rather than within detection volumes 111 as in FIG. 2B. In this way, the required capabilities of each individual sensor installation may be greatly reduced, allowing for the use of low-cost acoustic sensors, cameras, or RADAR antennas, for example.

In the example of FIG. 2C, an aircraft 14 (plane) is crossing a boundary 113-1 between two adjacent sectors 112, and another aircraft 14 (helicopter) is crossing a boundary 113-2 between another two adjacent sectors 112. At each boundary 113-1, 113-2 where a crossing of an aircraft 14 occurs, one or more corresponding sensor installations 110-1, 110-2 may detect the crossing through any of various relatively simple and inexpensive sensing means. Illustrative of the possible sensors that may be used to detect a crossing is a camera or plurality of cameras pointed along the relevant boundary. For example, in FIG. 2C, the sensor installation 110-1 may include one or more cameras pointed west (assuming west is to the left in FIG. 2C) to detect the crossing of boundary 113-1 by the plane 14. The field of view of each camera may be relatively narrow in the north-south direction since the boundary 113-1 is the area of interest. On the other hand, it may be desirable to have a relatively large field of view in the vertical up-down direction (perpendicular to the drawing sheet) depending on the expected height of the airspace needed to be safely navigated by UAVs 200. To this end, it is contemplated that a plurality of vertically arranged cameras may be provided at the sensor installation 110-1, all pointed west, in order to produce a vertically oriented panoramic view of the boundary 113-1. The number of regions enclosed by a set of boundaries may be many or as few as one, with the area of surveillance and quality of position and/or trajectory determination varying accordingly.

In the case of optical sensing technology with a narrower field of view than cameras, such as laser crossing sensors, it is contemplated that a vertically arranged plurality of laser crossing sensors may be provided on the sensor installations 110 on both sides of the relevant boundary 113 facing each other. The lasers or other narrowly defined detection regions may cross each other multiple times to create a kind of vertically oriented "web" or "net" at the boundary 113, with voids between detection regions being sized so that the likelihood of an aircraft 14 passing through a void is below an acceptable likelihood threshold.

In the case of acoustic sensors such as the terrestrial acoustic sensors described in more detail below, one possible embodiment of the sensor array 100c is to position a single acoustic sensor installation 110 at each point of the grid and to use the directional capabilities of the acoustic sensors to define the boundaries 113. In particular, as described in more detail below, each acoustic sensor installation 110 may include an array of microphones arranged to distinguish the direction of a sound in three dimensions, for example, to distinguish azimuth and elevation of a received sound. When the angle or vector of a detected aircraft 14 passes over a defined boundary 113 of the sensor array 100c, it may be regarded as a crossing of the boundary 113. Acoustic sensor data outside the relevant angles may be ignored. Thus, in accordance with processing performed locally at each sensor installation 110 (e.g., including a relevant locating algorithm as described in more detail below), the sensor data collected by the system 10 from each acoustic sensor installation 110 may simply be a binary YES/NO as to whether the detection occurred within a specified range of angles (corresponding to whether a boundary crossing occurred). In this way, the amount of data that needs to be transmitted by each sensor installation 110 may be kept very small, requiring very little network usage and power consumption, even though the acoustic sensors themselves may in principle have the capability of providing the system 10 with more detailed direction data. In other words, by arranging the sensor installations 110 as a pixelated sensor array 100c, the directional capability of the sensors may be leveraged to detect boundary crossings and thus approximate the location of aircraft 14, but without the cost in network traffic and power consumption associated with detecting and characterizing the direction of a given sound.

As an alternative to positioning the acoustic sensor installations 110 at each point in the grid, another possible embodiment using acoustic sensor installations 110 is to position a plurality of acoustic sensor installations 110 along each boundary 113 with overlapping detection volumes and to use the combined detection volumes of the acoustic sensor installations 110 on a given boundary 113 to define a crossing of the boundary 113. This concept is closely related to the "keep-out" concept that is described below in more detail in relation to FIGS. 6 and 7.

In the above-described configuration with overlapping detection volumes, adjacent acoustic sensors may both monitor for the crossing of the boundary 113 with one of the two adjacent sensors monitoring the boundary to its west and the other adjacent sensor monitoring the boundary to the east, for example, so that both sensors mutually monitor the same boundary 113. Such an arrangement can be used to improve the reliability of detecting boundary crossings by requiring two independent detections of a boundary crossing. Since environmental noises such as, but not limited to, cars, trucks and lawnmowers are much quieter than aircraft they may be detected by one of the adjacent sensors but not the other. Thus, requiring both adjacent sensors to detect a boundary crossing also reduces false alerting of aircraft that may otherwise be caused by these quieter environmental noises.

In order to determine the direction and/or trajectory of a given aircraft 14 whose crossing of a boundary 113 is detected by the sensor array 100c, the system 10 may, as in the case of the sensor array 100b described above, make inferences based on multiple sensor readings taken at different times over the entire sensor array 100c. For example, a sequence of boundary crossings at successive times that occur at adjacent boundaries 113 within the sensor array 100c may be used to establish a route that an aircraft 14 is taking as it flies through the airspace. In this way, at each subsequent boundary 113 that is crossed by the aircraft 14, it can be known above a threshold certainty which sector 112 is being entered by the aircraft 14 (as illustrated by the arrows and shaded sectors 112 in FIG. 2C) and which sector 112 is being exited. In general, as in the case of the sensor array 100b, the data of the entire sensor array 100c at successive times may be analyzed to calculate the most likely (and in some cases second-most likely, third-most likely, etc.) interpretation of the sensor data as to the positions and/or trajectories of one or more aircraft 14 flying within the airspace, with a resolution determined by the sizes of the sectors 112 for example.

Figure 3:
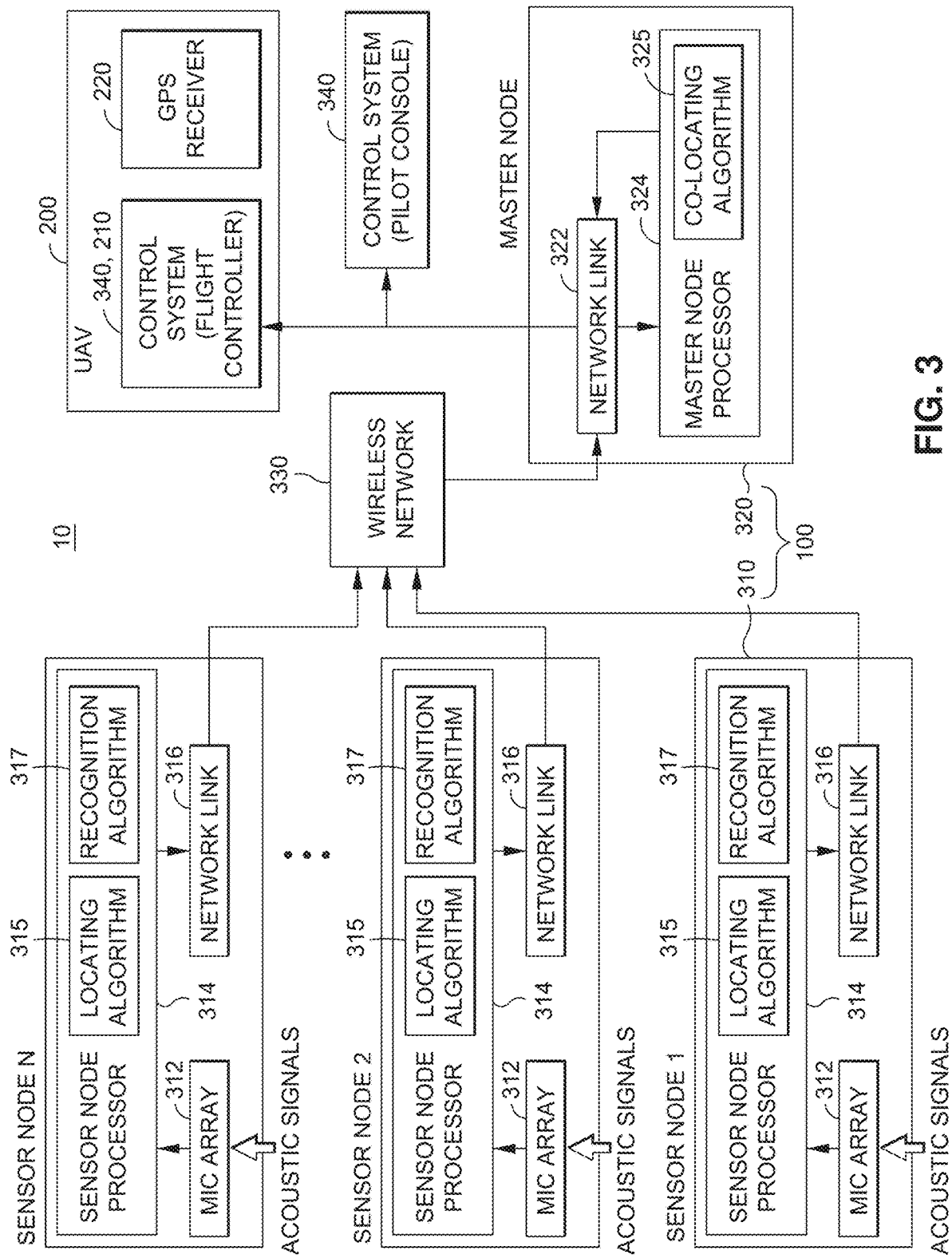
FIG. 3 is an internal view of the system.

FIG. 3 is an internal view of the system 10. As shown, any of the sensor arrays 100 (including, e.g., sensor arrays 100a, 100b, 100c) may be logically divided into sensor nodes 310 that are chiefly responsible for capturing acoustic or other sensor data and making initial estimates regarding a detected aircraft 14 (such as whether presence in a detection volume 111 or at a boundary 113 is detected) and master nodes 320 that are chiefly responsible for processing the sensor data and/or estimates collected from multiple sensor nodes and communicating with a control system 340 of the UAV 200. Each of the sensor nodes 310 may correspond to and represent the internal components and functionality of a ground-based acoustic sensor installation or other sensor installation 110 of the sensor array 100 shown in FIG. 1, 2A, 2B, or 2C. The master node 320 may represent the internal components and functionality of a computer that may be provided separately from the sensor installations 110 at a central location (e.g., a hub facility or a cloud computing environment running master node software) or in place of one of the sensor installations 110. Alternatively, as shown in the example of FIG. 1, the master node 320 may itself, like the sensor nodes 310, correspond to and represent the internal components of a sensor installation 110. This is illustrated by the communication between one of the sensor installations 110 and the UAV 200 as shown. In this case, the master node 320 may capture its own acoustic or other sensor data to combine with the sensor data of the sensor nodes 310. The responsibilities of master nodes 320 and sensor nodes 310 may thus be shared and the master node 320 may effectively serve as an enhanced sensor node 310. Such enhanced sensor nodes 310 may replace ordinary sensor nodes 310 at regular intervals throughout the sensor array 100 in order to share computing resources, maintain communication signal strength, and reduce latency. In some cases, all sensor nodes 310 may be enhanced sensor nodes, with no distinction made between sensor nodes 310 and master nodes 320 throughout the entire sensor array 100. In all cases, the functionality described in relation to each sensor node 310 and/or the master node 320 may in part be embodied in one or more local and/or cloud-based processors (e.g., microprocessors, FPGA, ASIC, etc.) coupled with associated software instructions residing locally in one or more non-transitory program storage media and/or in a cloud computing environment running sensor node and/or master node software.

For ease of explanation, the N sensor nodes 310 and single master node 320 shown by way of example in FIG. 3 have distinct responsibilities, with the N sensor nodes 310 capturing acoustic and/or other sensor data and making initial estimates with respect to the presence, location, and/or identity of the aircraft 14 and the master node 320 processing the sensor data and/or estimates collected from the N sensor nodes 310 and communicating with the control system 340 of the UAV 200. For capturing the sensor data, each of the sensor nodes 310 (and thus each of the sensor installations 110) may include a sub-array 312 of microphones as schematically illustrated by way of example or may alternatively include one or more cameras, laser crossing sensors, magnetic sensors, RADAR antennas, etc. depending on the particular type of sensor embodying the sensor node 310. Each of the sensor nodes 310 may further include a sensor node processor 314 and a network link 316 to a wireless network 330 (e.g., using a 4G wireless standard such as Long Term Evolution or LTE, a 5G wireless standard, or other cellular radio frequency communication technology via an LTE modem, data radio, etc.). While it is contemplated that a wired network (e.g., via ethernet or USB interface) may be used instead of the wireless network 330, the use of a wireless network 330 makes installation of the sensor array 100 easier as wiring does not need to be connected between the nodes 310, 320 of the sensor array 100, especially in the case of a temporary installation or a semi-permanent installation whose coverage area is expected to be modified from time to time. Bandwidth of the wireless network 330 may be ≤10 kbps/node, with latency of ≤1 second.

In the specific case of a system 10 that uses microphone sub-arrays 312 for collecting acoustic sensor data, the microphone sub-array 312 of each sensor node 310 may be arranged so as to distinguish the direction of a sound in three dimensions, for example, to distinguish azimuth and elevation of a received sound. In order to avoid picking up irrelevant ground-based sounds, the microphone sub-array 312 of each sensor node 310 may be disposed at an elevated height, for example, at the top of the respective sensor installation 110. In this regard, each of the sensor installations 110 may comprise a tower structure for disposing the sub-array 312 of microphones at an elevated height of, for example, 50-500 feet, preferably 100-200 feet. Alternatively, the sensor installations 110 may be attached to existing structures (e.g., rooftops, telephone poles, cellphone towers, etc.) in order to dispose the microphone sub-arrays 312 at an elevated height.

As sounds are picked up by the microphone sub-array 312 of a sensor node 310, the sensor node processor 314 may process the raw acoustic data or noise-filtered data thereof to produce sensor data indicative of the direction of the sound using a locating algorithm 315. The locating algorithm 315 may run the data through a beamformer. For example, with an appropriately arranged microphone sub-array 312, the sensor node processor 314 may produce sensor data that includes azimuth and elevation data determined from the raw acoustic data of the individual microphones in the microphone sub-array 312 (e.g., based on a time delay or phase shift between the raw acoustic data picked up from each microphone and the known relative positions of each microphone). The sensor data produced by the sensor node processor 314 may further include frequency and/or amplitude data of the sound based on the raw acoustic data. It is contemplated that the frequency range discernible by the sensor node 310 may be, for example, 20-2,048 Hz. In some cases, the sensor node processor 314 may additionally identify the source of the raw acoustic data including, for example, the aircraft type (e.g., model, size, engine, etc.), using a recognition algorithm 317. The recognition algorithm 317 may, for example, generate a descriptor based on the raw acoustic data (e.g., comprising values derived from frequency, amplitude, position, position derivatives such as speed or acceleration, etc.) and match the descriptor to a signature of a known airplane or other sound source in a database to produce recognition data identifying the source. As another example, the recognition algorithm 317 may employ machine learning such as a neural network to train the sensor node processor 314 to recognize specific aircraft. The sensor data produced by the sensor node processor 314 may further include such recognition data. The network link 316 may communicate the sensor data produced by the sensor node processor 314, including any estimates as to the position and/or identity of the aircraft 14, to the master node 320 over the wireless network 330. The sensor node processor 314 may further include a flight data recorder that records time-tagged real-time results/status and/or time-tagged raw acoustic data.

The master node 320 (which may be embodied in one of the sensor installations 110 or in a separate computer or cloud as described above) may include a network link 322 and a master node processor 324. The master node processor 324 may detect an aircraft such as the aircraft 14 based on sensor data collected from the microphones or other sensors of at least one of the plurality of sensor installations 110, for example, based on the sensor data produced by one or more sensor nodes 310 and received over the wireless network 330 via the network link 322. Using the sensor data of one or more sensor nodes 310, which may include azimuth and elevation data, frequency data, and/or amplitude data collected from the microphones of the acoustic sensor installation(s) 110 as described above for the case of acoustic sensor data or may more generally include image data, magnetic data, RADAR data, etc. or simply binary YES/NO presence detection data, the master node processor 324 may execute a co-locating algorithm 325 to refine the estimates produced by the sensor node(s) 310 and establish a higher degree of confidence in the detection of the aircraft 14 as well as in the result of any identifying and/or locating of the aircraft 14 as performed by the individual sensor node(s) 310. The master node processor 324 may further calculate a flight path 15 of the aircraft 14 based, for example, on a determination of an estimated position of the aircraft 14, an estimated heading of the aircraft 14, an estimated speed of the aircraft 14, an estimated acceleration of the aircraft 14, or a combination thereof.

For example, the position of the aircraft 14 may be estimated by triangulation methods using the combined azimuth and elevation data of the sensor data produced by two sensor nodes 310 disposed at known positions. To this end, the master node processor 324 may further base the estimated position on global positioning system (GPS) data of the sensor nodes 310 as described in more detail below. Heading, speed, and/or acceleration of the aircraft 14 may then be estimated using position estimates made at two or more successive times. In this regard, it is contemplated that the sensor data transmitted from each sensor node 310 to the master node 320 may include time data associated therewith. Alternatively, the co-locating algorithm 325 may assign time stamps to the sensor data as the sensor data is received by the master node 320 over the network link 322. The calculated flight path 15 may consist of one or more aspects of a predicted trajectory or path that the aircraft 14 will take, for example, a bearing and speed of the aircraft 14, an expected future position of the aircraft 14, etc.

Alternatively, the position and/or trajectory of the aircraft 14 may be readily estimated by the master node processor 324 according to a predetermined arrangement of the sensor installations 110 as a pixelated network, as exemplified by the sensor arrays 100b and 100c described in relation to FIGS. 2B and 2C. In this regard, the specific identity and/or location of a given sensor installation 110 within the sensor array 100b, 100c may be established or confirmed using the GPS data, for example. In the case of the sensor array 100b of FIG. 2B, for example, the position of the aircraft 14 may be calculated based on sensor data indicative of the presence of the aircraft 14 within one or within two or more overlapping detection volumes defined by known detection ranges. Refinement of the position estimation, as well as calculation of a trajectory of the aircraft 14, may be made on the basis of multiple successive presence detections collected over a time-ordered sequence of measurement samples. In the case of the sensor array 100c of FIG. 2C, the position and/or trajectory of the aircraft 14 may be calculated from successive detections of the presence of the aircraft 14 at boundaries 113 between defined sectors 112 of the airspace.

With the aircraft 14 having been detected by the master node processor 324, the network link 322 may transmit a signal based on the detection of the aircraft 14 to a control system 340 of the UAV 200 (e.g., over the wireless network 300 or a separate wireless communication modality). The transmitted signal may further include a calculated flight path 15 of the aircraft 14 as calculated by the master node processor 324 (e.g., based on the calculated trajectory as described above) and/or recognition data identifying the source of the sound or other sensor data (e.g., the aircraft type) as described above. In the case of a piloted UAV 200, the control system 340 of the UAV 200 may comprise a human-operated pilot console that generates a human-interpretable warning in response to receipt of the transmitted signal. For example, the signal transmitted from the master node 320 may include the calculated flight path 15 of the aircraft 14, and the warning generated by the control system 340 may include an indication of the flight path 15, such as a relative bearing between the aircraft 14 and the UAV 200 or a graphical representation of the flight path 15 in relation to the position of the UAV 200. The human pilot, having been notified of the aircraft 14, may then move the UAV 200 to avoid the aircraft 14, for example, by executing an evasive maneuver, by rerouting the UAV 200 to avoid the aircraft 14 (e.g., adding an additional waypoint to a programmed route of the UAV 200), or simply by rerouting the UAV 200 to an airspace that is non-navigable by manned aircraft (e.g., close to the ground or under a canopy of trees). Alternatively, the signal transmitted from the master node 320 may not include an indication of the flight path 15, for example, in a case where the flight path 15 is not calculated and the aircraft 14 is merely detected (e.g., the presence of an aircraft within a vicinity). The signal transmitted from the master node 320 may thus constitute only a generic warning signal. In response to receipt of the warning signal, the pilot console may simply generate an audio and/or visual warning (e.g., an alarm tone or light), signifying that the human pilot should reroute the UAV 200 to an airspace that is non-navigable by manned aircraft (e.g., close to the ground etc.), irrespective of the exact flight path of the aircraft 14.

In the case of a UAV 200 having an automatic guidance system, the control system 340 of the UAV 200 may comprise a flight controller 210 included in the UAV 200 that controls a position of the UAV 200 in response to receipt of the transmitted signal. The flight controller 210 may, for example, receive inputs from various sensors (e.g., gyroscope, accelerometer, magnetometer, barometer, etc.) as well as control signals such as a signal transmitted by the master node 320 as described herein. The flight controller 210 may control the motors and flight control surfaces (e.g., ailerons, elevators, rudders, etc.) of the UAV 200 in response to such inputs and control signals. As above, the signal transmitted from the master node 320 may include a calculated flight path 15 of the aircraft 14, in which case the flight controller 210 may move the UAV 200 to avoid the aircraft 14, for example, by executing an evasive maneuver, by rerouting the UAV 200 to avoid the aircraft 14 (e.g., adding an additional waypoint to a programmed route of the UAV 200), or simply by rerouting the UAV 200 to an airspace that is non-navigable by manned aircraft (e.g., close to the ground or under a canopy of trees). Alternatively, as in the case of the piloted UAV 200, the signal transmitted from the master node 320 may not include an indication of the flight path 15, constituting only a generic warning signal. In response to receipt of the warning signal, the flight controller 210 may simply reroute the UAV 200 to an airspace that is non-navigable by manned aircraft (e.g., close to the ground etc.), irrespective of the exact flight path of the aircraft 14.

The signal transmitted by the master node 320 to the control system 340 of the UAV 200 may be further based on a position or flight path 201 of the UAV 200. In this way, the master node 320 may more precisely determine that a collision with a particular UAV 200 is imminent. To this end, the network link 322 of the master node 320 may receive a communication from the UAV 200 including information indicative of the position or flight path 201 of the UAV 200. As an example, the UAV 200 may include a global positioning system (GPS) receiver 220, and the master node 320 may collect GPS data from the GPS receiver 220 and determine the position or flight path 201 of the UAV 200 therefrom. The determination of the flight path 201 of the UAV 200 may use a portion of the co-locating algorithm 325 described above and may, for example, be based on successive GPS data points received from the UAV 200 over a period of time. The signal transmitted from the master node 320 to the UAV 200 warning or controlling the UAV 200 of the approaching aircraft 14 may thus be based on GPS data collected from the GPS receiver 220 of the UAV 200. In this way, the sensor array 100 may determine that the UAV 200 and aircraft 14 are on a collision course as shown in FIG. 1.

In the above examples of the sensor node 310 and master node 320, it is described that the master node processor 324 may calculate the flight path 15 of the aircraft 14 based on sensor data collected from the sensor node(s) 310. However, it is also contemplated that the sensor node processor(s) 314 (e.g., the locating algorithm(s) 315 thereof) may themselves calculate a first estimate of the flight path 15 of the aircraft 14 and/or track the aircraft 14 as it moves through the vicinity of each sensor node 210. In this case, the master node processor 324 may receive one or more such estimates of the flight path 15 or tracking data from sensor nodes 310 and refine the one or more estimates to establish the calculated flight path 15. Along the same lines, it is contemplated that each individual sensor node 310 may receive GPS data collected from the GPS receiver 220 of the UAV 200, with the sensor node processor(s) 314 calculating a first estimate of the possibility of a collision and the master node processor 324 thereafter refining the estimate(s). In a case where initial estimates are made at the sensor node 310 level (e.g., detection of aircraft, locating, flight path, tracking, identity, etc.) and later refined at the master node 320 level based on collected sensor data from multiple sensor nodes 310, the accuracy may be improved because multiple estimates may be compared and because the microphones and/or other sensors may be spread out over greater distances for better resolution of the raw acoustic and/or other sensor data. In addition, the use of multiple sensor nodes 310 may allow for a greater physical range of detection as the sensor array 100 may be spread out over a large region. In general, the sensor nodes 310 may be regarded as Internet of Things (IoT) devices, with the sensor node processors 314 thereof serving as edge processors to maximize the portion of processing that occurs locally following signal acquisition at each sensor node 310 (and thus at each sensor installation 110). In this way, necessary network bandwidth of the system 10 can be reduced. It is contemplated that the signal acquisition, edge processing, and cellular or other network transmission capability of each sensor node 310 may be solar powered as described in more detail below.

Figure 4:
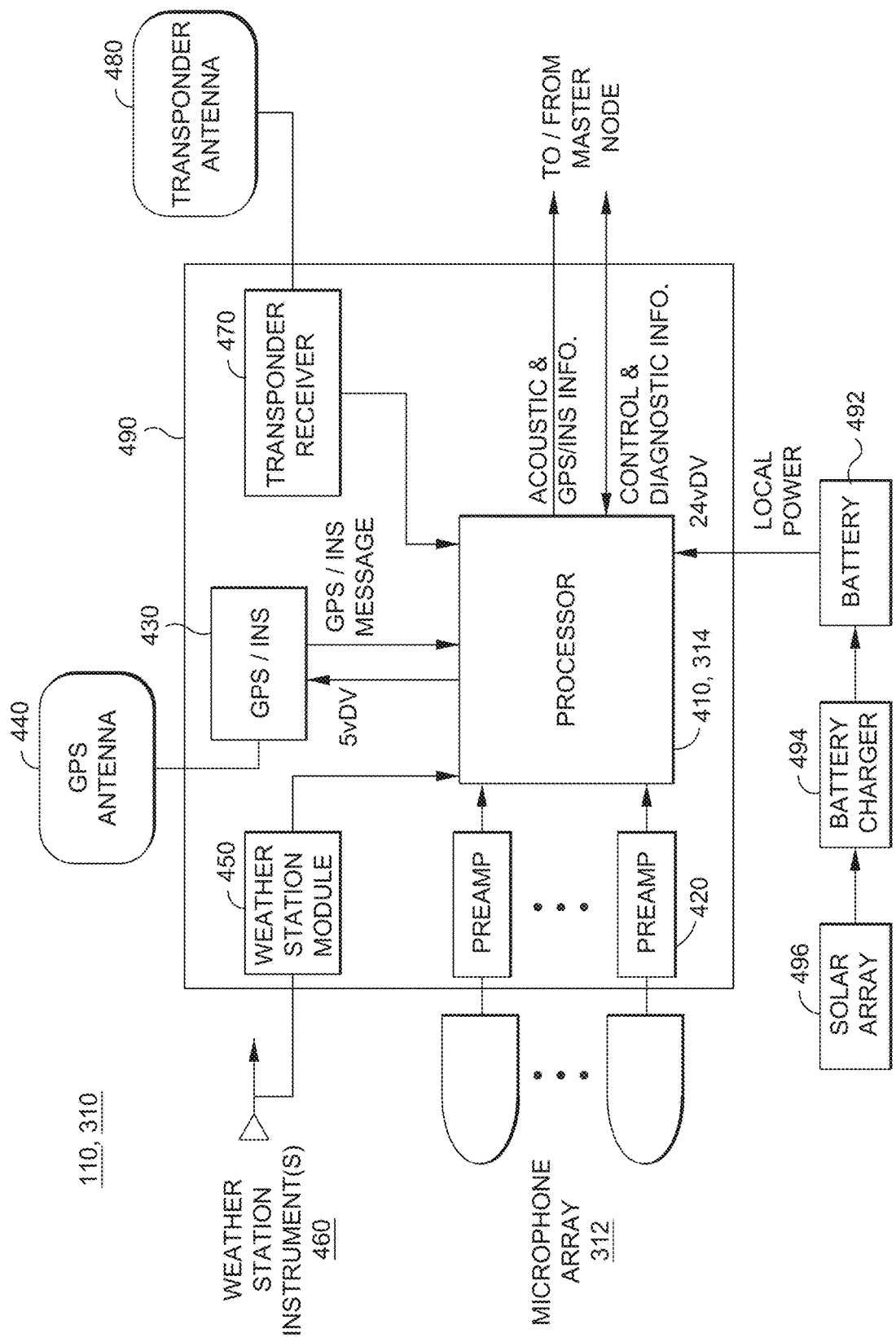
FIG. 4 is an internal view of a sensor node of the sensor array.

FIG. 4 is an internal view of a sensor node 310 of the sensor array 100. As shown in FIG. 4, electronic components of each sensor node 310 may include the microphone array 312 or other sensor(s) and a processor 410 (e.g., a microprocessor, FPGA, or ASIC) that may function as the sensor node processor 314 (e.g., edge processor), as well as one or more preamplifiers 420 for receiving a raw acoustic signal or other sensor data from the microphone array 312 or other sensor(s) and amplifying the signal to produce input data to the processor 410, a global positioning system (GPS) antenna 440 for receiving GPS signals (e.g., from satellites), and a GPS/inertial navigation system (INS) 430 that generates a GPS/INS message based on the GPS signals. The GPS/INS system 430 may include a GPS receiver that receives the GPS signals from multiple satellites and an INS module that may generate magnetometer, gyroscope, and/or accelerometer data to be corrected or calibrated by the GPS signals. The processor 410 may determine the position of the sensor node 310 (e.g., of the sensor installation 110) or, more specifically, the positions of the microphones of the microphone array 312 or other sensor(s) (e.g., camera, laser crossing sensor, magnetic sensor, RADAR antenna, etc.), based on the resulting GPS/INS message. In this way, the sensor node 310 may include a node self-survey system that maintains a known position and orientation of the sensor installation 110, allowing the sensor installation 110 to be moved from time to time depending on the changing needs of the sensor array 100 while still being able to accurately detect aircraft such as the aircraft 14. Owing to the INS module of the GPS/INS system 430, a tilt or sway in a tower structure of the sensor installation 110 can be accounted for and the accuracy of the microphone array 312 or other sensor(s) can be maintained. As shown, and as described above in relation to FIG. 3, it is also contemplated that acoustic or other sensor data and/or GPS/INS data may be communicated to another node such as a master node 320 for further processing and refinement of estimates.

One or more of the sensor nodes 310 may further include a weather station module 450 coupled to one or more weather station instruments 460, such as a thermometer, barometer, wind vane, wind sock, anemometer, hygrometer, pyranometer, rain gauge, precipitation sensor, etc. The weather station module 450 may determine current or predicted environmental conditions (e.g., a current wind speed, a forecasted chance of storm, etc.) from measurements of the one or more weather station instruments 460. The processor 410, 314 and or a downstream master node processor 324 may thus take into consideration the current or predicted environmental conditions (or multiple such readings/predictions) when transmitting the signal to warn or control the UAV 200. For example, based on weather conditions as determined from weather station modules 450 of one or more sensor nodes 310, the master node processor 324 may determine that a requested UAV maneuver is not advisable due to high winds. As a result, the master node processor 324 may instead recommend a temporary suspension of all UAV flights.

One or more of the sensor nodes 310 may further include a transponder receiver 470 operable to receive aircraft transponder signals via a transponder antenna 480. The transponder receiver 470 may, for example, be an Automatic Dependent Surveillance-Broadcast (ADS-B) receiver. Depending on the equipment installed on the incoming aircraft 14, transponder data included in a signal received by the transponder receiver 470 may include an identification of the aircraft 14, an altitude of the aircraft 14, a GPS location of the aircraft 14, etc. The processor 410, 314 and or a downstream master node processor 324 may thus take into consideration the transponder data when identifying, locating, or calculating a flight path 15 of the aircraft 14. The resulting more accurate and/or more detailed determinations may allow the master node 320 to better advise or control the UAV 200 when aircraft 14 are equipped with such transponders. The addition of a transponder receiver 470 also enables the cross-validation of received aircraft transponder signals to detect inaccurate or spoofed aircraft transponder signals, such as may result from faulty aircraft instrumentation informing the aircraft transponder, or by bad actors who intentionally produce false aircraft transponder signals.

As noted above, it is contemplated that one or more of the sensor nodes 310 may be solar powered. To this end, the sensor node 310 may include a battery 492 that is charged by a battery charger 494 powered by a solar array 496 comprising one or more solar panels of photovoltaic cells. As depicted in FIG. 1, the solar array 496 may be on or near each sensor installation 110 and may be sized to be two feet by three feet, for example. Because each individual sensor installation 110 may be powered locally by its own solar array 496, it is not necessary to install new power lines or large onsite electrical generators, making continuously operated low-altitude airspace surveillance over large, often rural areas feasible, with each sensor installation 110 being transportable by a two-man crew over distances of three or more kilometers.

Assuming a fixed solar-cell efficiency, the solar power level available to a remote aircraft surveillance system may be limited by three predominate factors: the region in which the aircraft surveillance system is placed, the time of year it is operating, and the size of the solar array 496. On average, there are different amounts of solar power available within the different regions of the Earth, with the regions of predominant interest for low-altitude airspace surveillance being those regions bounded by latitudes of 66 degrees and 44 minutes in both the Northern and Southern hemispheres. The amount of solar power available also depends on the time at which the solar array 496 operates (solar power being unavailable during the evening/night), and the intensity of sunlight is generally lower during the winter in many regions due to the presence of clouds and weather effects found in many regions of the world. Therefore, the batteries 492 may be used to power solar power air-space surveillance systems 10 during inclement weather and during the evening/night. These batteries may then be recharged by the solar arrays 496 (e.g., using battery chargers 494) such that they can power the airspace surveillance systems 10 when solar power is not available. Finally, the larger the size of the solar array 496 the more power provided given the sunlight conditions. Three additional factors may determine the required size of a solar-charged battery powered system for low-altitude airspace surveillance. The first is the power required by the surveillance system, the second is the maximum weight of the overall system such that it can be transported and installed to remote sites, and the third is the total permittable cost of low-altitude airspace surveillance.

Approaches like RADAR and LIDAR actively radiate energy and detect the return of that energy reflected off an aircraft, which typically requires large amounts of power. The required power for conventional RADAR and LIDAR systems may be roughly 500 watts for circular surveillance with a three-kilometer radius. It is contemplated that a preferred approach may be to use passive sensors that receive the sound, electromagnetic radiation, scattered/reflected light, or other such information emanated by an aircraft. Acoustic sensors and camera-based systems for surveilling low-altitude airspace, such as those described in detail herein, use dramatically low power relative to RADAR. These passive sensors may be readily powered with solar power, which eliminates the need for site improvements and thereby enables economical surveillance of low altitude airspace. Additional passive sensor approaches, such as passive magnetic detection, may likewise be efficiently powered by solar power.

The power required to surveil an airspace may be affected by two additional factors. Sensor information generally must be transmitted to a central location. Since wired transmission may not be sufficiently cost effective for most sites in which a low-altitude airspace surveillance system would be installed, radio frequency (e.g., cellular) transmission may be used as described herein. Since radio frequency transmission requires energy proportional to the amount of information transmitted, it is preferable to reduce the amount of information transmitted by locally processing the sensor information within a remote airspace surveillance system. Processing sensor information at a site can reduce raw sensor data into higher-level information that may be transmitted with lower power. To this end, the use of edge processing at each sensor node 310 may be preferred. However, this processing requires power as well. Preferably, the total power may be minimized including both the power to transmit information and the power to process the information into a reduced form. The power required to transmit data is bounded by the energy required to transmit to either adjacent sites or to a cellular network. Preferably, the overall surveillance system 10 reduces surveillance sensor data to less than a one-kilobyte message transmitted at a rate of no more than two Hertz. This helps to minimize the transmit power required, allowing each sensor installation 110 to require as little as 20 watts of power or less. In the case of a passive acoustic-based surveillance system 10 as described in detail herein, having low power processing electronics to reduce the transmitted power required, the system may require only 14 watts of nominal power, including that needed to power the sensors, the processing electronics, and a radio to transmit the data. The acoustic sensor may consist of an eight-microphone phased array as described in more detail herein, with each microphone using less than 100 milliwatts. As the processor 410, a field programmable gate array (FPGA) or Application Specific Integrated Circuit (ASIC) may be used to reduce the acoustic data to low bandwidth aircraft alerts and tracks, each message consisting of less than one kilobyte of data, that are transmitted at two Hertz. This FPGA or ASIC may be run at a much lower power than microprocessors currently found in the art. Firmware for the FPGA may allow for processing more data in parallel but at low clock rates in order to minimize the power used. The power of the processing system could be further reduced by developing a custom ASIC based on the FPGA firmware design, further reducing the solar power requirements.

Weight is another consideration determining the size of the battery and solar-panel needed for low-altitude airspace surveillance. Most sites for low-altitude airspace surveillance are remote, and many of them require materials to be brought in on foot. Thus, the batteries must be large enough to meet the surveillance system's power needs under the latitude and weather conditions present, but also light enough for transport by foot. This distance may be three kilometers nominally for remote sites. Given a preferred sensor range of at least three kilometers for each sensor installation 110, three kilometers may be the typical distance that each sensor installation 110 must be transported when being installed. By making the sensor installation 110, including battery 492, weigh less than 50 kilograms, the sensor installation can be transported over the required distance by a two-man crew under typical terrain conditions.

Figure 5:
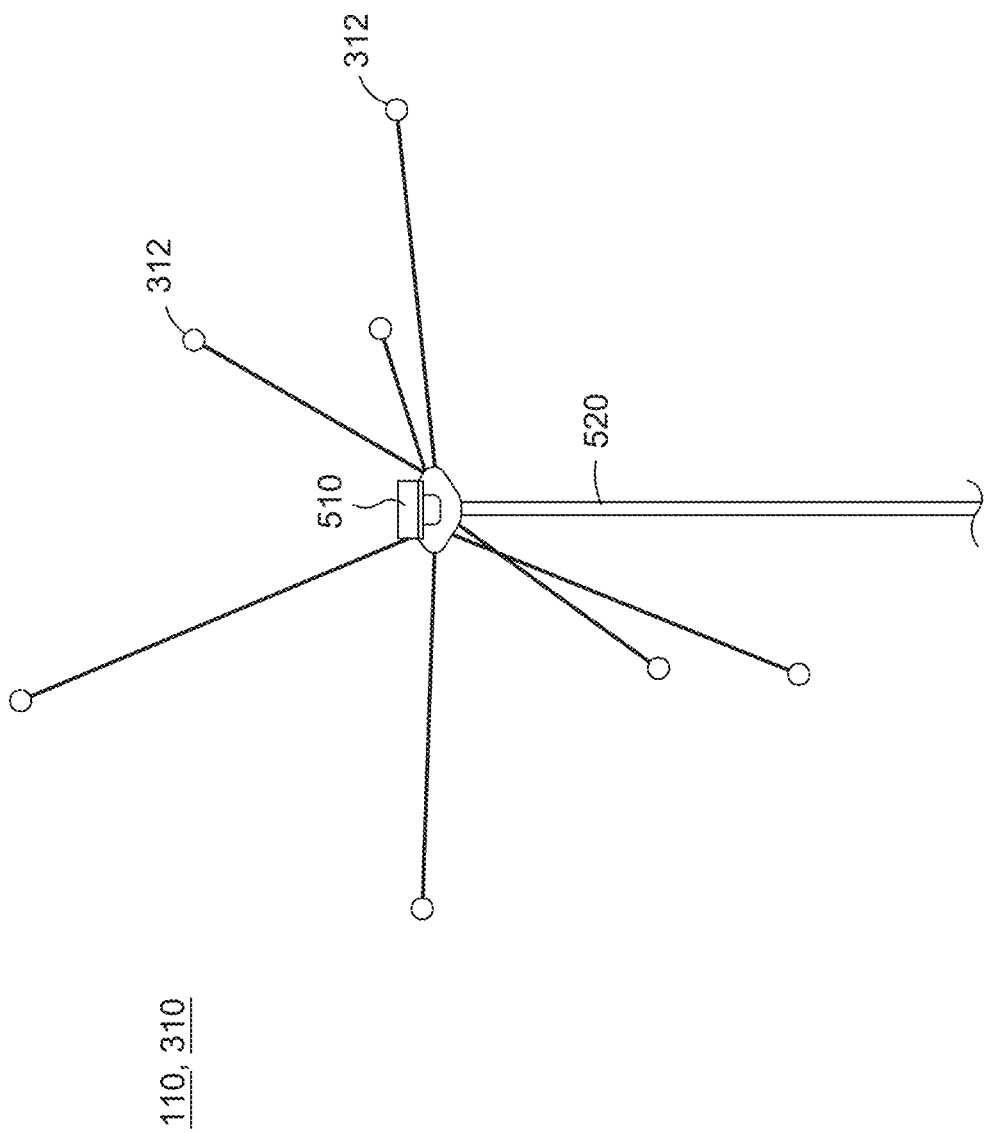
FIG. 5 is an external view of a sensor node of the sensor array.

FIG. 5 is an external view of a sensor node 310 of the sensor array 100 in the specific example of a ground-based acoustic sensor installation 110. As shown, the external structure of an acoustic sensor installation 110 serving as the sensor node 310 may include a body 510 from which the microphone array 312 extends outward in three dimensions. The microphone array 312 may include, for example, eight microphones arranged to distinguish azimuth and elevation of received sounds. The body 510 may contain, for example one or more printed circuit boards 490 (see FIG. 4) including the internal electronic components of the sensor node 310. The body 510 may be supported by a tower structure 520 for disposing the microphone array 312 at an elevated height to avoid ground-based acoustic noise, for example, 50-500 feet, preferably 100-200 feet. The solar array 496 described above may be mounted on the same tower structure 520, typically toward the bottom of the tower structure 520 for easier access as illustrated in FIG. 1 (e.g., for installation and maintenance). Alternatively, as noted above, the tower structure 520 may be omitted and the acoustic sensor installation 110 including the microphone array 312 may be installed on a pre-existing structure at the elevated height. For example, the body 510 of the acoustic sensor installation 110 may be mounted (e.g., bolted) to a building or terrain feature. In this case, the solar array 496 may be mounted on or near the body 510 and may similarly be mounted to the building or terrain feature, for example.

Figure 6:
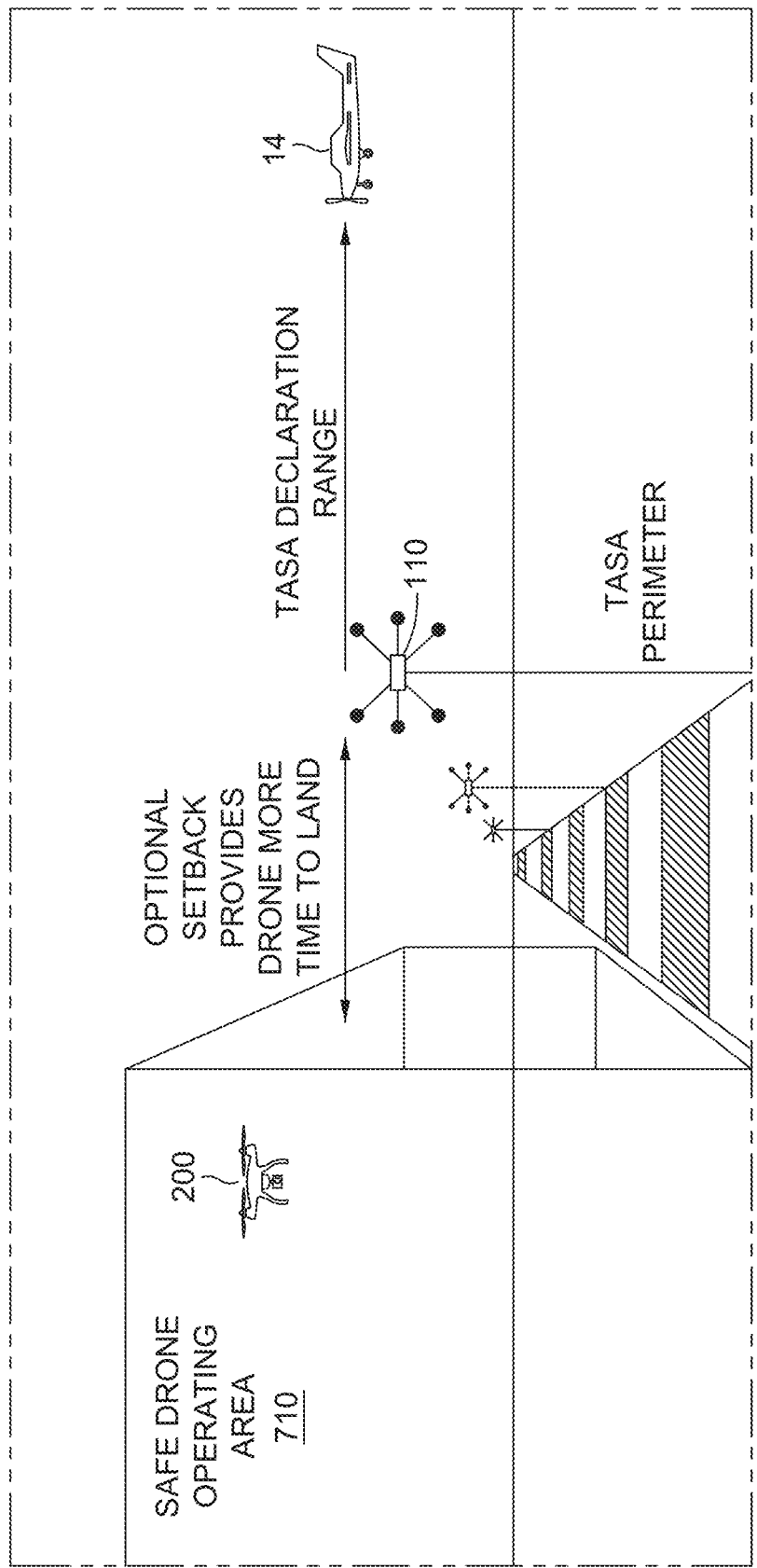
FIG. 6 is a schematic side view of the system illustrating a "keep-out" concept of operations.
Figure 7:
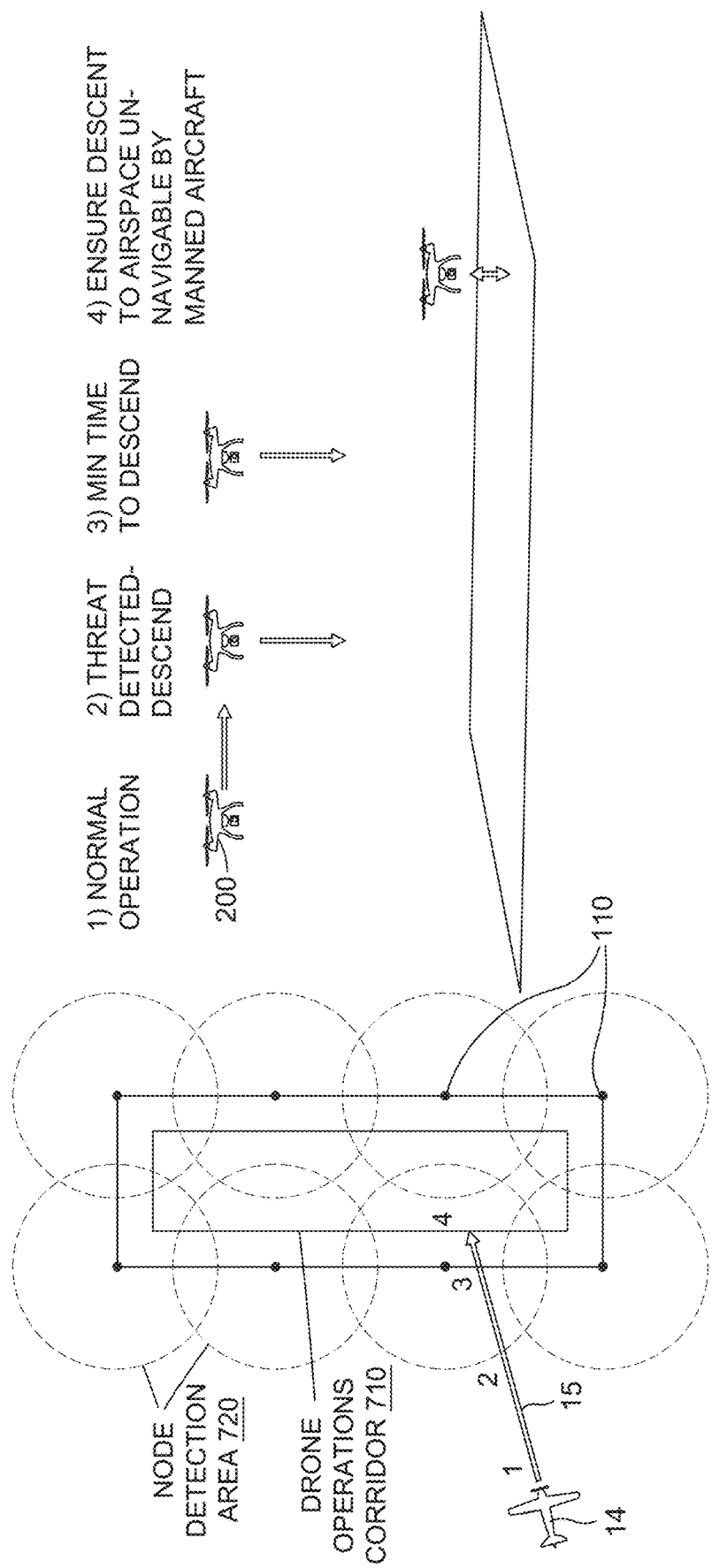
FIG. 7 is a schematic overhead view of the system illustrating a "keep-out" concept of operations.

FIG. 6 is a schematic side view of the system 10 illustrating a "keep-out" concept of operations. FIG. 7 is a schematic overhead view thereof. In the example of FIGS. 6 and 7, a UAV 200 is operating in a safe drone operating area 710, shown in the overhead view of FIG. 7 as a drone operations corridor 710. During normal operation of the UAV 200 within the area/corridor 710, the UAV 200 must share airspace with manned aircraft, such as the aircraft 14 that is shown approaching. Owing to the surrounding sensor installations 110 of the sensor array 100 in a "keep-out" arrangement as described below, the area/corridor 710 may be considered "safe" for drone operations. The sensor node processor(s) 314 and master node processor(s) 324 may execute real-time software and/or firmware based on the described "keep-out" concept of operations (ConOps) or a variety of other ConOps.

As depicted in FIG. 7, each of the sensor installations 110 defines a respective node detection area 720 representing the range of the sensor installation 110. When an aircraft enters within a node detection area 720 of one of the sensor installations 110, the aircraft will be detectable by the sensor installation 110 (e.g., the noise of the aircraft will be loud enough for an acoustic sensor installation 110 to detect). As noted above in the example of the pixelated sensor array 100b of FIG. 2B, in the case of acoustic sensors it is noted that the node detection areas 720 may represent the detection range for the quietest aircraft that the sensor array 100 is designed to detect at an acceptable detection probability (e.g., ≥99% detection probability within 3 km detection radius). Continuing the "keep-out" example of FIG. 7, the sensor installations 110 may be arranged such that the node detection areas 720 overlap, with the sensor array 100 therefore acting as a "fence" that aircraft cannot pass without being detected. In this regard, it should be noted that the height of the sensor array 100 may be selected with consideration given to the vertical range of operation of the UAVs 200 as well as the expected altitudes of manned aircraft. For instance, while it is contemplated that multiple sensor installations 110 may be stacked vertically in order to create a higher fence with overlapping node detection areas 720 in the vertical direction, it is also understood that the vertical range of operation of the UAVs 200 may in some cases make this unnecessary. For example, a very high-flying aircraft may be permitted to cross over the fence without being detected, so long as it would be practically impossible for the aircraft to subsequently descend to an altitude that would interfere with the UAVs 200 before completely crossing over the area/corridor 710.

The "keep out" arrangement of the sensor array 100 shown in FIGS. 6 and 7 may function as follows. At time 1 (see FIG. 7), an aircraft 14 approaches the area/corridor 710 where UAVs 200 are operating normally. At this time, the aircraft 14 has not entered into the node detection area 720 of any of the sensor installations 110 and is thus out of range and not detected. At time 2, the aircraft 14 enters the node detection area 720 of one or more of the sensor installations 110. A side view of this moment in time is shown in FIG. 6, with the terrestrial acoustic sensor array ("TASA") declaration range representing the radius of one of the node detection areas 720 for the specific example of ground-based acoustic sensors. At this point, the detecting sensor installation(s) 110 and/or a master node 320 in communication therewith may detect the aircraft 14 and transmit a signal to control or warn the UAVs 200 that are operating within the area/corridor 710. In this example, the UAVs 200 may respond simply by descending to an airspace that is not navigable by manned aircraft, e.g., near the ground, such that the calculation of the flight path 15 of the aircraft 14 or even the locating of the aircraft 14 may not be necessary. In this way, the "keep-out" ConOps keeps the UAVs 200 safe while being relatively simple and requiring only a minimum node count to establish the "fence" without needing more involved aircraft tracking capability. Moving the UAV 200 close to ground may be an especially useful maneuver considering that many UAVs have relatively slow lateral maneuver capability.

Referring back to FIG. 7, the aircraft 14 crosses the "fence" at time 3, shown as the outer rectangle on which the eight sensor installations 110 are arranged. In FIG. 6, this is referred to as the TASA perimeter. In some cases, the area/corridor 710 of drone operations may be defined by the TASA perimeter. However, in order to provide additional time for the UAVs 200 to land after a threat is detected, an optional setback may be provided as shown in FIG. 6 and as represented by the space between the outer and inner rectangles in FIG. 7. As the aircraft 14 traverses this setback region, the UAVs 200 continue to descend. The setback region may be wide enough to provide the UAVs 200 with a minimum amount of time needed to descend, considering the descending speed of the UAVs 200 and the maximum height of normal UAV operations. Finally, at time 4, the aircraft 14 enters the safe drone operation area/corridor 710. Owing to the sensor array 100, the UAVs 200 have all descended to a safe position by this time, allowing the aircraft 14 to fly overhead without risk of collision. Once the aircraft 14 has passed, normal operations of the UAVs 200 may resume. It is contemplated that the sensor array 100 may determine that the aircraft 14 has passed, for example, by tracking the position of the aircraft 14 or simply by observing the disappearance of sensor data associated with the aircraft 14.

It should be noted that the "keep-out" or "fence" arrangement and concept described in relation to FIGS. 6 and 7 is fully compatible with the pixelated networks of sensors of FIGS. 2B and 2C. For example, in the context of the sensor array 100b shown in FIG. 6, the overlapping detection volumes 111 may primarily function as a way of combining the relatively imprecise sensor data of individual sensor installations 110 (which may simply be binary presence data, for example) into more precise position determinations and trajectory calculations. However, all or a portion of the detection volumes 111 may additionally function as a "fence" as described in relation to FIGS. 6 and 7. As one possible scenario, there may be a sensor array 100 that is like the sensor array 100b shown in FIG. 2B but that includes one or more high-importance or high-risk "pockets," where, for example, a relatively large amount of UAV activity is expected to occur (e.g., a large number of UAVs 200 or continuous UAV activity). The sensor installations 110 on the borders of such pockets of activity might function both as part of the pixelated network and also as a "fence," with their detection volumes 111 serving as node detection areas 720 as shown in FIGS. 6 and 7 to establish a safe drone operating area 710 within the defined pocket. Within the pocket, there may be no practical need for additional sensor installations 110 because of the existence of the fence. Meanwhile, away from the border of the pocket, the detection volumes 111 of the sensor installations 110 may not have this additional "fence" function. For example, there may be some detection volumes 111 that are used solely to help establish the positions and trajectories of nearby/incoming aircraft 14 but that are themselves too far from expected UAV activity to be needed as a "fence."

Figure 8:
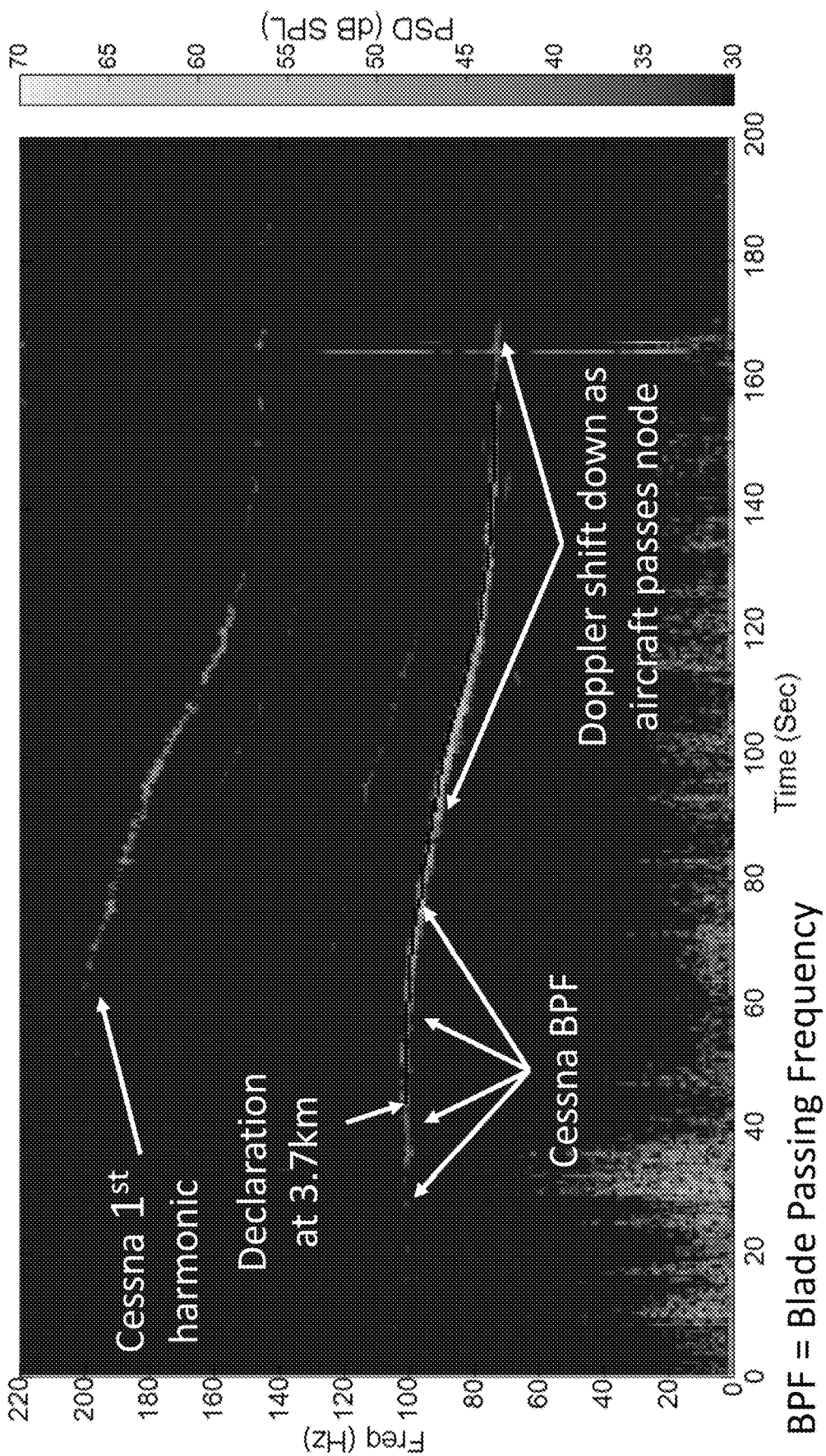
FIG. 8 is a graphical representation of an example of raw acoustic data of a sensor node of the sensor array.

FIG. 8 is a graphical representation of an example of raw acoustic data of a sensor node 310 of the sensor array 100 in the case of a terrestrial acoustic sensor array (TASA). As described above, a recognition algorithm 317 of the sensor node processor 314 may recognize a particular aircraft type from the raw acoustic data captured by the microphone array 312. As shown, the sensor node 310 has picked up a blade passing frequency (BPF) of approximately 100 Hz and a first harmonic thereof at approximately double the BPF, indicative of a Cessna aircraft. At around 45 seconds on the x-axis, when the aircraft is 3.7 km from the sensor node 310, the sensor node 310 declares the presence of an aircraft based on the power spectral density (PSD) of the raw acoustic data indicating a high sound pressure level (dB SPL) at the BPF. The recognition algorithm 317 may subsequently identity the aircraft as a Cessna based on the unique frequency profile including the BPF and in some cases first harmonic thereof, and/or other features as described above (e.g., amplitude, amplitude modulation, micro-Doppler, position, position derivatives, etc.). The results of such identification may be included in the sensor data to be transmitted from the sensor node 310 to the master node 320. The results of the identification may constitute one of several estimates presented by sensor nodes 310 to the master node 320 for comparison and refinement. Alternatively, it is contemplated that the data shown in FIG. 8 may constitute the sensor data that is transmitted from a sensor node 310 to a master node 320, with the master node 320 running a recognition algorithm 317 thereafter. In this case, the identification of the aircraft may be based on the raw acoustic data from multiple sensor nodes 310, which may be combined to enhance the signal to noise ratio.

Figure 9:
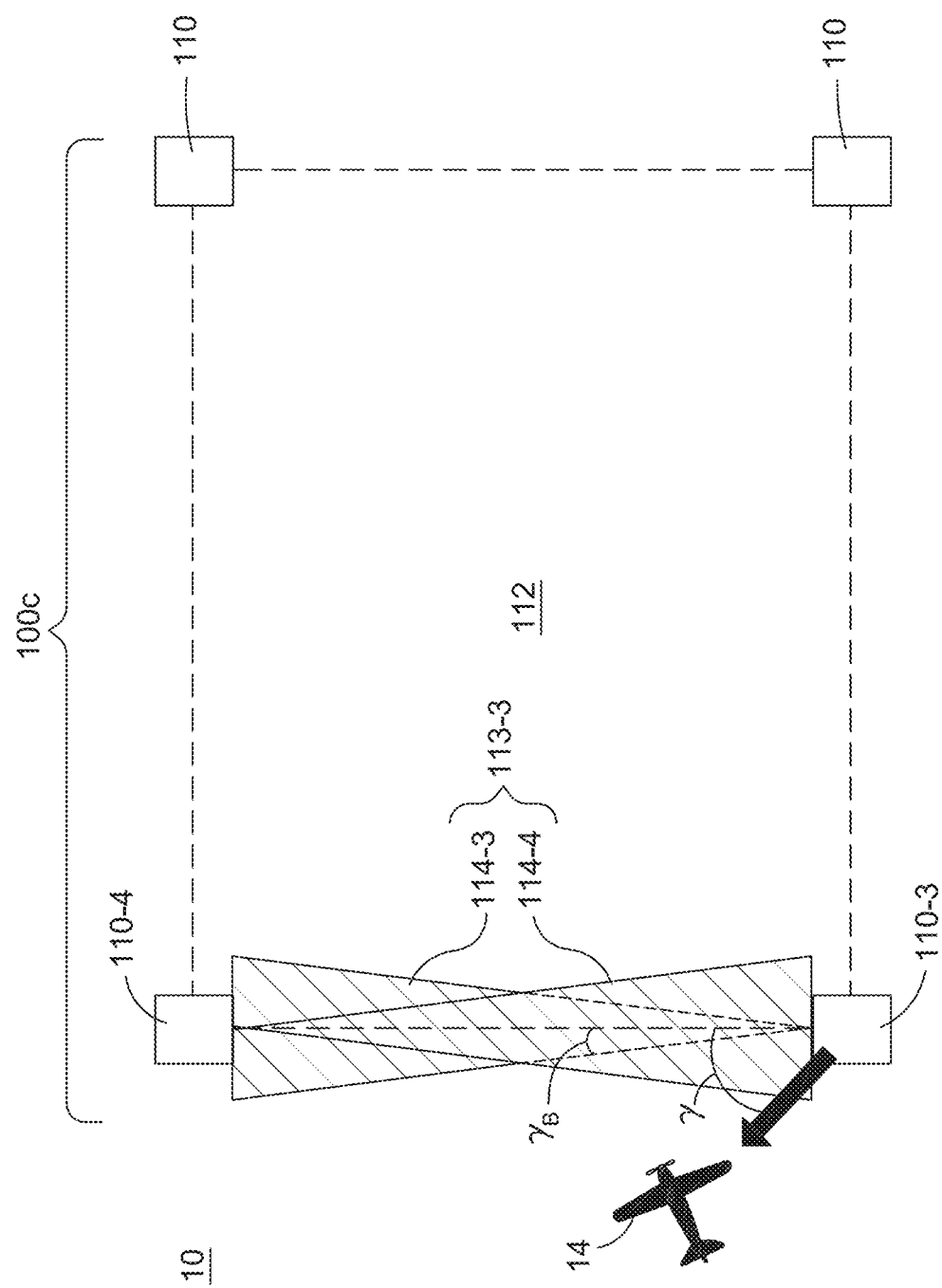
FIG. 9 is another schematic overhead view of the system.

FIG. 9 is another schematic overhead view of the system 10, showing a close-up view of one sector 112 of the pixelated sensor array 100c of FIG. 2C. As described above, a crossing of a given boundary 113 may be defined when an aircraft 14 is detected at an angle or vector that passes over the boundary 113 of the sensor array 100c. In more detail, as shown in FIG. 9, a given boundary 113-3 of a sector 112 may consist of one or more overlapping detection regions 114-3, 114-4 corresponding to detection angle ranges $\gamma_B$, where the detection angle range $\gamma_B$ of a given sensor installation 110 may be a designated subrange of a larger range such as a circular detection area or a spherical detection volume. In the illustrated example, the combination (union) of detection regions 114-3 and 114-4 of adjacent sensor installations 110-3 and 110-4 together define the boundary 113-3 between these sensor installations 110-3, 110-4 (or define one of several vertically arranged segments of the boundary 113-3 in a direction perpendicular to the drawing sheet). As the aircraft 14 approaches, the sensor installation 110-3 monitors the detection angle $\gamma$ of the aircraft 14 within the detection range of the sensor installation 110-3. When the detection angle $\gamma$ of the aircraft 14 falls within the detection angle range $\gamma_B$ defining the detection region 114-3, the sensor installation 110-3 may regard the aircraft 14 as crossing the boundary 113-3 and may output detection data to the system 10 as described above. It is noted that the detection region(s) defining a given boundary 113 may be wedge-shaped as shown (defined by a detection angle range $\gamma_B$) or may consist of one or more line-shaped regions (e.g., laser tripwire), depending on the particular detection technology employed. It is also contemplated that the sequence of detections within two or more detection regions 114-3, 114-4 associated with a single boundary 113-3 may help to inform the system 10 regarding the direction of travel of the aircraft 14 as it crosses the boundary 113-3. In some cases, the detection step may be accomplished by determining when the position of the aircraft 14 changes from one side of the boundary 113 to another.

Figure 10:
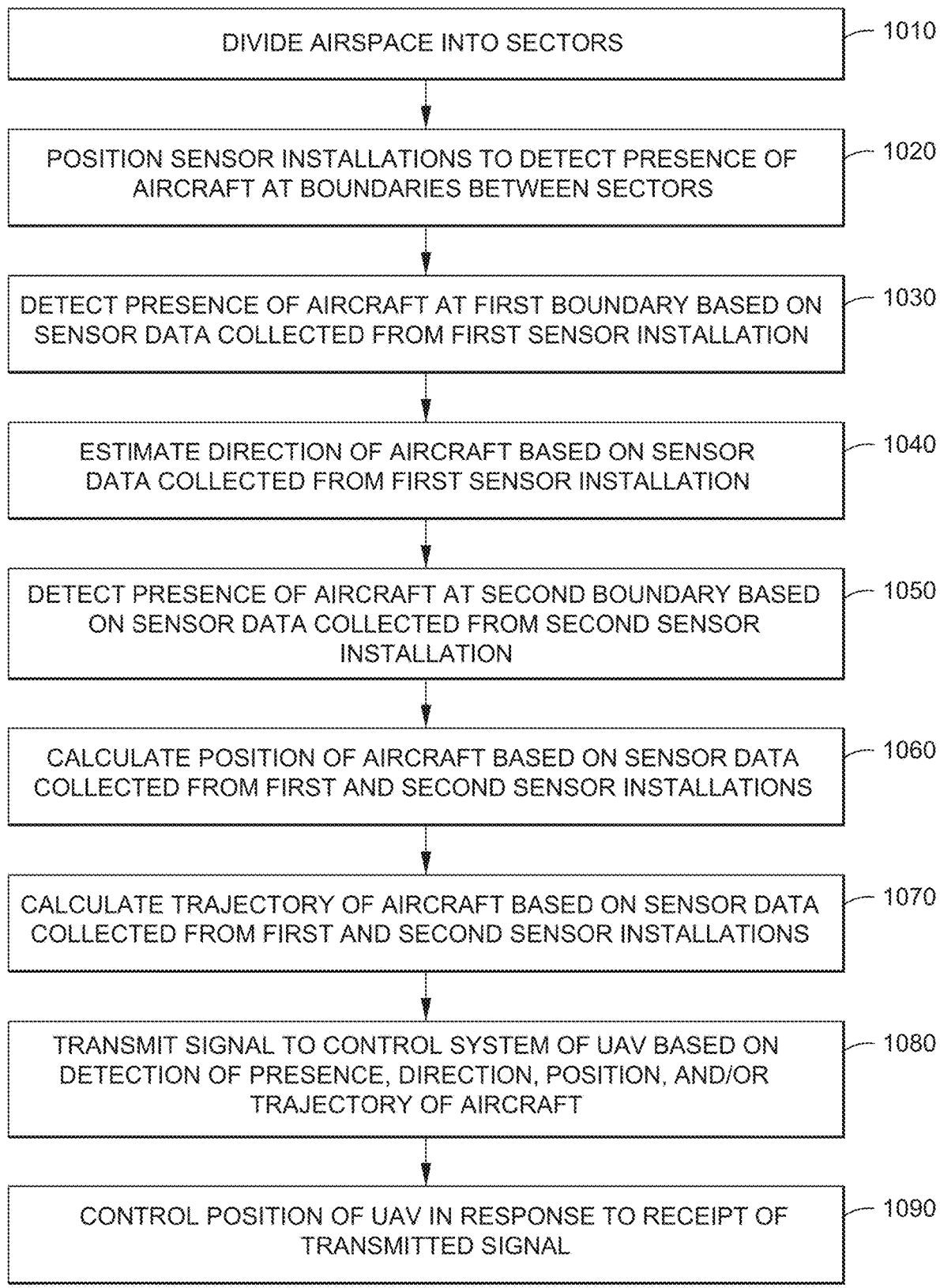
FIG. 10 is an example operational flow of the system.

FIG. 10 is an example operational flow of the system 10 in relation to the pixelated sensor array 100c of FIG. 2C. The operational flow of FIG. 10 may begin with dividing an airspace into sectors 112 (step 1010) and positioning sensor installations 110 to detect the presence of aircraft 14 at boundaries 113 between the sectors 112 (step 1020). The sectors 112, which may comprise a grid such as the rectangular grid shown in FIG. 2C for example, may be defined according to the particular needs of the application and any limitations imposed by the geography. There may be some portions of the airspace that are arranged into a regular grid of identically shaped and sized sectors 112 and other portions where the sectors 112 are defined arbitrarily and irregularly as needed, such as where the airspace abuts a cliff, a body of water, or other impediment. The dividing of the airspace into sectors 112 may be done by an expert such as an engineer or may be done automatically by a computer (e.g., using a neural network or other machine learning model) based on input data describing the airspace and underlying geography that the airspace encompasses. The sensor installations 110, which may be ground-based installations (e.g., mounted on tower structures 520, buildings, or terrain features), airborne installations (e.g., mounted on free-floating balloon-based platforms or drone-based platforms), or a combination of ground-based and airborne installations, may be positioned to detect boundary crossings and, thus, to define the boundaries 113 as recognized by the system 10. For example, the sensor installations 110 may be positioned to define overlapping detection regions 114-3, 114-4 as described in relation to FIG. 9, and to this end the sensor installations 110 may typically (though not necessarily) be positioned at intersections of the boundaries 113 such as at grid points between the sectors 112. It is contemplated that teams of two or more installers may position the sensor installations 110 accordingly, with a relatively small workforce (e.g., teams of two) being feasible due to the lightweight design of the preferred embodiments of the sensor installations 110 described herein (e.g., including solar arrays 496 and lightweight batteries 492).

With the sensor array 100c having been set up in accordance with steps 1010 and 1020, the operational flow of FIG. 10 may continue with detecting the presence of an aircraft 14 at a first boundary 113 based on sensor data collected from a first sensor installation 110 (step 1030), detecting the presence of the aircraft 14 at a second boundary 113 based on sensor data collected from a second sensor installation 110 (step 1050), and calculating the position of the aircraft 14 based on the sensor data collected from the first and second sensor installations 110 (step 1060) as described above in relation to FIGS. 2C and 9. For example, each sensor node 310 may determine whether a boundary crossing has occurred and may transmit data indicative of the boundary crossing including the identification of the particular boundary 113 and/or of the particular sensor node 110 (which may correspond to one or more boundaries 113). Upon receiving the boundary crossing data of a sequence of boundary crossings, a master node 320 may calculate the likely position of the aircraft 14 and/or rank possible positions of the aircraft 14 by likelihood, with each additional boundary crossing further narrowing down the possibilities and increasing the certainty of a presumed position of the aircraft 14. In the same way, the trajectory of the aircraft 14 may be calculated based on the sensor data collected from the first, second, etc. sensor installations 110 (step 1070). By calculating the position and/or trajectory based on boundary crossings, the system 10 is able to leverage the predefined arrangement of the sensor array 100c (e.g., as a grid of sectors 112), thus relaxing the requirements of each individual sensor installation 110 to be capable of determining position and/or trajectory on its own (and reducing network load as the data transmitted can be minimal). On the other hand, depending on the capabilities of each individual sensor installation 110, the operational flow may in some cases further include estimating a direction and/or other more detailed information of the aircraft 14 based on the sensor data collected from any individual sensor installation 110 using any of the methods described herein (step 1040).

The operational flow of FIG. 10 may continue with transmitting a signal to a control system 340 of a UAV 200 based on the detection of presence, direction, position, and/or trajectory of the aircraft 14 (step 1080). For example, referring to FIG. 3, the master node 320 may transmit the signal to a control system 340 embodied in a flight controller 210 of the UAV 200 or in a pilot console operated by a human pilot as described above. The position of the UAV 200 may then be controlled accordingly in response to receipt of the transmitted signal (step 1090). In this way, the UAV 200 may be moved or otherwise controlled to avoid or reduce the risk of collision with the detected aircraft 14 based on the output of the pixelated sensor array 100c.

Figure 11:
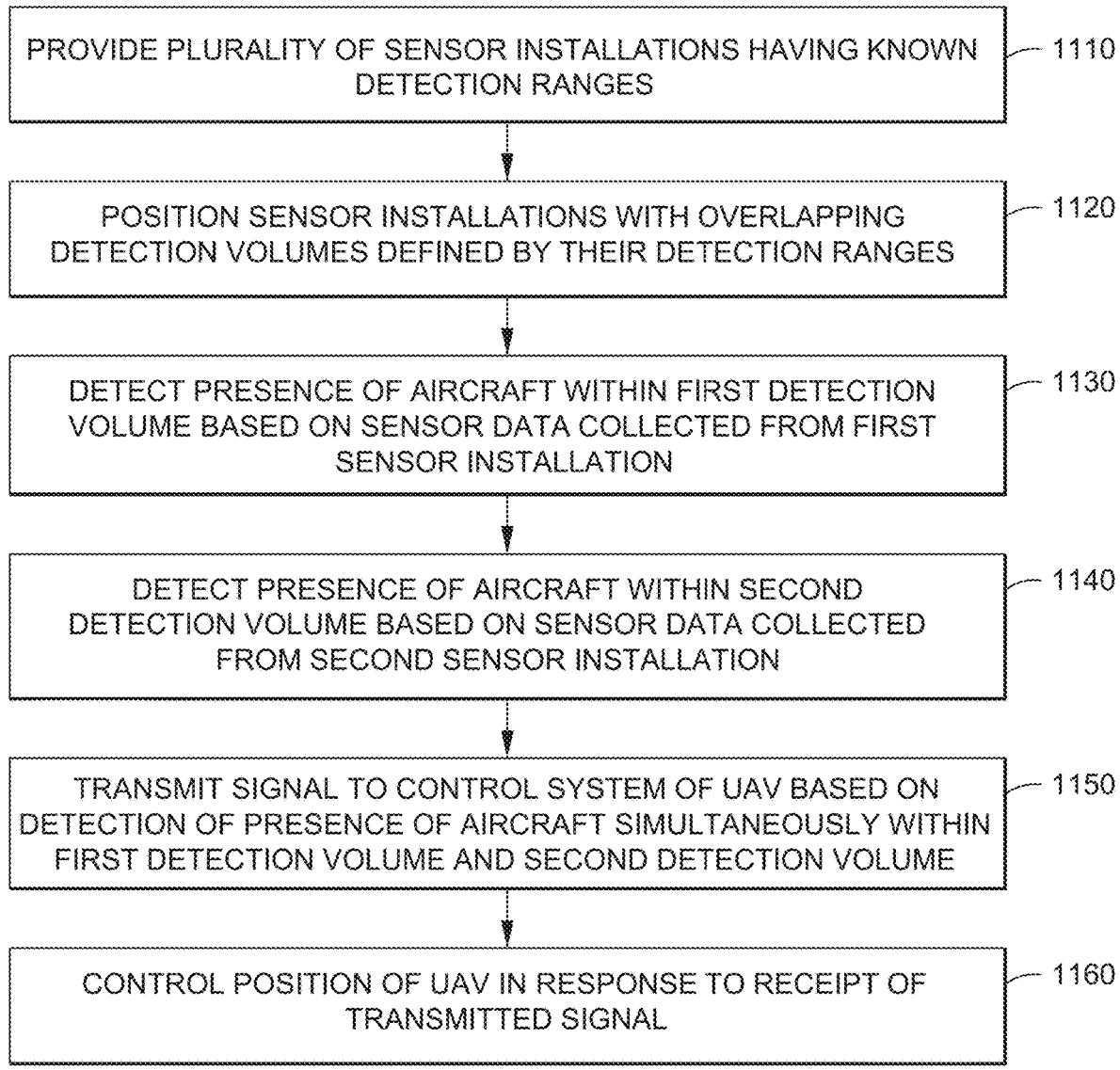
FIG. 11 is another example operational flow of the system.

FIG. 11 is another example operational flow of the system 10, relating to the pixelated sensor array 100b of FIG. 2B. The operational flow of FIG. 11 may begin with providing a plurality of sensor installations 110 having known detection ranges (step 1110) and positioning the sensor installations 110 with overlapping detection volumes 111 defined by their detection ranges (step 1120). The sensor installations 110 may be arranged as a grid such as the rectangular grid shown in FIG. 2B for example (the locations of the sensor installations 110 corresponding to the centers of the detection volumes 111), with the layout depending on the particular needs of the application and any limitations imposed by the geography. As in the case of the sectors 112 of the sensor array 100c, the sensor installations 110 defining the overlapping detection volumes 111 may be arranged in some portions as a regular grid and in other portions arbitrarily and irregularly as needed. The planning for the positioning of the sensor installations 110 according to their detection volumes 111 may be done by an expert such as an engineer or may be done automatically by a computer (e.g., using a neural network or other machine learning model) based on input data describing the airspace and underlying geography that the airspace encompasses. The density of sensor installations 110 and the amount of overlap between detection volumes 111 of adjacent sensor installations 110 may depend on the desired resolution of the sensor array 100b and may vary across the sensor array 100b, with regions of greater concern having more sensor installations 110 with finer overlaps for pinpointing positions of aircraft 14 more precisely. As above, the sensor installations 110 may be ground-based installations (e.g., mounted on tower structures 520, buildings, or terrain features), airborne installations (e.g., mounted on free-floating balloon-based platforms), or a combination of ground-based and airborne installations. It is contemplated that teams of two or more installers may position the sensor installations 110 accordingly, with a relatively small workforce (e.g., teams of two) being feasible due to the lightweight design of the preferred embodiments of the sensor installations 110 described herein (e.g., including solar arrays 496 and lightweight batteries 492).

With the sensor array 100b having been set up in accordance with steps 1110 and 1120, the operational flow of FIG. 11 may continue with detecting the presence of an aircraft 14 within a first detection volume 111 based on sensor data collected from a first sensor installation 110 (step 1130) and detecting the presence of the aircraft 14 within a second detection volume 111 based on sensor data collected from a second sensor installation 110 (step 1140). The operational flow may continue with transmitting a signal to a control system 340 of a UAV 200 based on the detection of presence of the aircraft 14 simultaneously within the first detection volume 111 and the second detection volume 111 as described in relation to FIG. 2B (step 1150). For example, referring to FIG. 3, each sensor node 310 may determine whether a detection has occurred within a corresponding detection volume 111 and transmit the data of the detection (including identification of the sensor node(s) 310) to the master node 320. The master node 320 may then calculate the position, direction, and/or trajectory of the aircraft 14 based on the sensor data collected from the sensor nodes 310 (in some cases sequence or timing data thereof) as described above in relation to FIG. 2B and transmit a signal to the control system 340 (e.g., flight controller 210 or human-operated pilot console) indicative of the simultaneous detection of presence and/or the calculated position, direction, and/or trajectory. The position of the UAV 200 may then be controlled accordingly in response to receipt of the transmitted signal (step 1160). In this way, the UAV 200 may be moved or otherwise controlled to avoid or reduce the risk of collision with the detected aircraft 14 based on the output of the pixelated sensor array 100b. By calculating the position and/or trajectory based on the detection of aircraft presence in overlapping detection volumes 111 (or time sequence thereof), the system 10 is able to leverage the predefined arrangement of the sensor array 100b (e.g., as a grid of sensor installations 110 defining a plurality of overlapping detection volumes 111), thus relaxing the requirements of each individual sensor installation 110 to be capable of determining position and/or trajectory on its own (and reducing network load as the data transmitted can be minimal). On the other hand, depending on the capabilities of each individual sensor installation 110, the operational flow may in some cases further include estimating a direction and/or other more detailed information of the aircraft 14 based on the sensor data collected from any individual sensor installation 110 using any of the methods described herein.

In accordance with the systems and methods described herein, a grid or other arrangement of small, low cost, and low power IoT sensors can provide economical surveillance of low altitude airspace in support of UAV operations. Even simple sensors that provide minimal aircraft detection capability by themselves can be used as a large network of such sensors to surveil an entire airspace. These sensors may be small microphone arrays, cameras, laser crossing sensors, magnetic sensors or other low-cost sensors. These sensors may even be small, low-cost RADARs with limited power and range. As a network, each sensor may transmit data to a central server, which may then be compiled into an overall surveillance of the local airspace. This surveillance may be available as a subscription service to those who monitor UAV operations, either as a surveillance display to human operators or as a machine interface for fully autonomous UAV operations. In this regard, the master node 320 described in relation to FIG. 3 may function as a server such as a cloud-based server that communicates with various client devices to provide surveillance as a service (e.g., over a wide area network such as the Internet).

Though an individual sensor element may be capable of detecting the presence of low altitude aircraft (e.g., via its sound or image), and may perhaps even be capable of estimating its direction relative to the sensor, it is more difficult for an individual sensor to efficiently determine the position of aircraft. When arranged as a pixelated sensor array 100b, 100c as described herein, the combined data from these sensors allows algorithms on a central server to locate low-altitude aircraft via any one or a combination of the methods described herein (and as described above particularly in relation to FIGS. 2B, 2C, and 9-11). These sensor arrays 100b, 100c may be arranged in a variety of regular or irregular grid arrangements in order to address buildings or terrain features which may obscure line-of-sight. The methods may even be used together in a composite manner. Different sensor types (e.g., acoustic and camera) may be used together in different parts of the sensor array 100 according to the features and limitations of the terrain and airspace at each location. It is also contemplated that additional sensor information, such as time-delays between sensor detection and Doppler shifts in the frequency of signals (e.g., for acoustic sensors), may be used by centralized algorithms executed at the master node 320 to further refine the calculated position and/or trajectory of surveilled aircraft 14.

Unlike conventional UAV-mounted systems that increase the size and weight of the UAV, the disclosed arrays 100 of sensor installations 110 can be ground-based as described above, making size and weight less of a concern and significantly relaxing the demands on the system to distinguish an approaching aircraft's signatures from the UAV's own noise. The power requirements of the disclosed arrays 100 may also be minimal, e.g., less than 50 W/node and in some cases less than 20 W/node or even 14 W/node as described above. As a result, the disclosed systems can be installed at relatively low cost over large areas and/or on a temporary basis. For example, at the site of a one-time concert or sporting event or at a construction project site, the disclosed system can be installed in support of a fleet of aerial photography/videography UAVs. Similarly, the disclosed system can be installed at a disaster site to assist UAVs deployed for disaster relief efforts (e.g., locating hurricane victims, surveying wreckage, delivering food and other supplies, etc.). Temporary setups of the disclosed system may also be used in support of UAVs used for surveying or mapping difficult-to-access geographic regions such as eroded coastlines. Airborne platforms may also be mixed in with ground-based installations, entailing potentially more costly installation but allowing for more flexibility in covering a varied geography underlying the airspace of interest. Owing to the pixelated nature of the preferred sensor arrays 100b, 100c described above, such multi-type sensor arrays 100 can easily function as a cohesive whole, with overlapping detection volumes 111 and/or detection boundaries 113 being used to leverage the known network layout and reduce the amount of data that must be transmitted, further reducing the power requirements and costs of the system 10.

In addition to making temporary installations viable, the low cost of the disclosed system makes more permanent installations viable over very large areas. For example, the disclosed arrays of elevated acoustic or other sensor installations can be set up along shipping and delivery routes used by package-delivering UAVs (e.g., for same-day residential delivery). In some cases, such installations may be only semi-permanent in that the towers or other sensor installations can be moved to accommodate expanding or changing shipping/delivery routes. Additional examples of permanent or semi-permanent installations include agricultural uses, where the disclosed systems can be installed in support of UAVs that monitor crops (e.g., using infrared) and/or deliver fertilizer, insecticide, etc. Very large-scale permanent or semi-permanent systems can be installed along international borders in support of border patrol UAVs and in large wildlife areas in support of UAVs monitoring for illegal activity such as poaching and illegal deforestation.

Moreover, as UAVs become more prevalent and are deployed in high numbers patrolling the same areas or transiting the same corridors, the disclosed ground-based and other sensor arrays 100 may be more practically scalable than conventional UAV-based detection systems, owing to their comparative simplicity. It is also contemplated that, in some circumstances, an abundance of safety may be served by the deployment of both the disclosed system 10 and airborne systems in combination, for example, with the ground-based and airborne systems working in tandem to issue an advisory to a UAV flight controller and suggest UAV actions to avoid collision.

In general, the disclosed system 10 may have applications in various industries where UAV operations may be beneficial. Applications in the construction industry may include, for example, stake plan model creation, construction progress monitoring, earthwork and volumetrics, contour mapping, and cut & fill mapping. Applications in the energy industry may include, for example, powerline corridor mapping, methane pipeline inspection, fixed site security (e.g., at a power plant or refinery), right of way assessment, and solar panel hotspot analysis. Applications in the communications industry may include, for example, cell tower inspection and cell tower vicinity inspection. Applications in the insurance industry may include, for example, flood plain mapping, property benchmarking, prompt/immediate post catastrophe inspection, damage classification, crop damage quantification, and commercial site materials auditing. Applications in the agriculture industry may include, for example, yield estimation, stand count quantification, retail & marketing auditing, weed-infestation identification, weed/infestation treatment status, and collection & storage auditing. Applications in the government perimeter monitoring industry may include, for example, coastal management, topography mapping (especially erosion zones), and border surveillance & monitoring. Applications in the government commerce operations industry may include, for example, positive control of vehicle progress (e.g., trains, trucks, aircraft) and commercial channel inspection (particularly post-catastrophe) in relation to roads and bridges, airports, and waterways.

While the disclosed subject matter is not limited to ground-based sensor installations 110, it should be noted that the ground-based sensor installations 110 described in relation to the disclosed system 10 may be ground-based in the sense that they are not fixed to a UAV or other aircraft in flight. In the simplest of implementations, the sensor installations 110 may additionally be stationary, allowing for the greatest reductions in cost and the least consideration required with respect to noise cancelation. However, mobile ground-based acoustic sensor installations 110 (e.g., on a track or ground-based vehicle) are contemplated as well. Such mobile systems 10 may allow for rapid redeployment of the terrestrial acoustic sensor array 100 as needed.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of detecting and preventing airspace collision with an unmanned aerial vehicle (UAV), the method comprising:
   dividing an airspace into a plurality of sectors;
   positioning a plurality of sensor installations to define detection angle ranges for detecting presence of an aircraft at respective boundaries between the sectors;
   detecting presence of the aircraft at a first of the boundaries based on sensor data collected from a first one of the sensor installations that is positioned to define a first detection angle range for detecting presence of the aircraft at the first boundary; and
   transmitting a signal based on the detection of the presence of the aircraft at the first boundary to a control system of the UAV.

2. The method of claim 1, further comprising:
   detecting presence of the aircraft at a second of the boundaries based on sensor data collected from a second one of the sensor installations that is positioned to detect presence of the aircraft at the second boundary; and
   calculating a position of the aircraft based on the sensor data collected from the first sensor installation and the sensor data collected from the second sensor installation.

3. The method of claim 2, wherein the sensor data collected from the first sensor installation is acoustic sensor data, and the sensor data collected from the second sensor installation is not acoustic sensor data.

4. The method of claim 2, wherein the position of the aircraft is calculated based on a sequence of the detections of the presence of the aircraft at the first boundary and the second boundary.

5. The method of claim 2, further comprising calculating a trajectory of the aircraft based on the sensor data collected from the first sensor installation and the sensor data collected from the second sensor installation.

6. The method of claim 5, wherein the trajectory of the aircraft is calculated based on a sequence of the detections of the presence of the aircraft at the first boundary and the second boundary.

7. The method of claim 1, further comprising estimating a direction of the aircraft based on the sensor data collected from the first sensor installation.

8. The method of claim 1, wherein the plurality of sensor installations includes one or more ground-based sensor installations.

9. The method of claim 1, wherein the plurality of sensor installations includes one or more acoustic sensor installations, each of the one or more acoustic sensor installations including a sub-array of microphones.

10. The method of claim 9, wherein the plurality of sensor installations further includes one or more sensor installations having a sensor selected from the group consisting of a camera, a laser crossing sensor, a magnetic sensor, and a RADAR antenna.

11. The method of claim 1, wherein the plurality of sectors comprises a grid.

12. The method of claim 1, wherein the control system of the UAV comprises a human-operated pilot console that generates a human-interpretable warning in response to receipt of the transmitted signal.

13. The method of claim 1, wherein the control system of the UAV comprises a flight controller included in the UAV that controls a position of the UAV in response to receipt of the transmitted signal.

14. The method of claim 13, wherein the flight controller initiates an evasive maneuver of the UAV or reroutes the UAV in response to receipt of the transmitted signal.

15. The method of claim 14, wherein the flight controller reroutes the UAV to an airspace that is non-navigable by manned aircraft in response to receipt of the transmitted signal.

16. A non-transitory program storage medium on which are stored instructions executable by a processor or programmable circuit to perform operations for detecting and preventing airspace collision with an unmanned aerial vehicle (UAV), the operations comprising:
  detecting presence of an aircraft at a first of a plurality of boundaries between sectors of an airspace based on sensor data collected from a first one of a plurality of sensor installations that is positioned to define a first detection angle range for detecting presence of the aircraft at the first boundary; and
  transmitting a signal based on the detection of the presence of the aircraft at the first boundary to a control system of the UAV.

17. The non-transitory program storage medium of claim 16, wherein the operations further comprise:
  detecting presence of the aircraft at a second of the boundaries based on sensor data collected from a second one of the sensor installations that is positioned to detect presence of the aircraft at the second boundary; and
  calculating a position of the aircraft based on the sensor data collected from the first sensor installation and the sensor data collected from the second sensor installation.

18. A system for detecting and preventing airspace collision with an unmanned aerial vehicle (UAV), the system comprising:
  a plurality of sensor installations positioned to define a first detection angle range for detecting presence of an aircraft at respective boundaries between a plurality of sectors of an airspace;
  a processor for detecting presence of the aircraft at a first of the boundaries based on sensor data collected from a first one of the sensor installations that is positioned to define a first detection angle range for detecting presence of the aircraft at the first boundary; and
  a network link for transmitting a signal based on the detection of the presence of the aircraft at the first boundary to a control system of the UAV.

19. The system of claim 18, wherein the processor further detects presence of the aircraft at a second of the boundaries based on sensor data collected from a second one of the sensor installations that is positioned to detect presence of the aircraft at the second boundary and calculates a position of the aircraft based on the sensor data collected from the first sensor installation and the sensor data collected from the second sensor installation.

20. The system of claim 18, wherein each of the plurality of sensor installations includes a solar array for powering the sensor installation.

\* \* \* \* \*